United States Patent
Hsieh et al.

(10) Patent No.: US 10,158,836 B2
(45) Date of Patent: Dec. 18, 2018

(54) CLIPPING FOR CROSS-COMPONENT PREDICTION AND ADAPTIVE COLOR TRANSFORM FOR VIDEO CODING

(71) Applicant: QUALCOMM Incorporated, San Diego, CA (US)

(72) Inventors: Cheng-Teh Hsieh, Del Mar, CA (US); Vadim Seregin, San Diego, CA (US); Jianle Chen, San Diego, CA (US); Rajan Laxman Joshi, San Diego, CA (US); Krishnakanth Rapaka, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 15/006,563

(22) Filed: Jan. 26, 2016

(65) Prior Publication Data

US 2016/0227224 A1 Aug. 4, 2016

Related U.S. Application Data

(60) Provisional application No. 62/110,324, filed on Jan. 30, 2015, provisional application No. 62/113,269, (Continued)

(51) Int. Cl.
*H04N 9/79* (2006.01)
*H04N 11/04* (2006.01)
(Continued)

(52) U.S. Cl.
CPC ............ *H04N 9/79* (2013.01); *H04N 9/64* (2013.01); *H04N 11/002* (2013.01); *H04N 11/02* (2013.01); *H04N 11/042* (2013.01); *H04N 11/044* (2013.01); *H04N 19/124* (2014.11); *H04N 19/13* (2014.11); *H04N 19/149* (2014.11); *H04N 19/176* (2014.11); (Continued)

(58) Field of Classification Search
None
See application file for complete search history.

(56) References Cited

U.S. PATENT DOCUMENTS 9,468,332 B2 * 10/2016 Mitchell ................. A47J 31/44
9,648,332 B2 * 5/2017 Kim ..................... H04N 19/186
(Continued)

FOREIGN PATENT DOCUMENTS

WO 2014113390 A1 7/2014

OTHER PUBLICATIONS

W. Dai, M. Krishnan, & Topiwala, "RCE1: Adaptive Color Transforms for Range Extensions", JCT-VC Document M0048-r1 (Apr. 2013).*

(Continued)

*Primary Examiner* — David N Werner
(74) *Attorney, Agent, or Firm* — Shumaker & Sieffert, P.A.

(57) ABSTRACT

A device for encoding or decoding video data may clip first residual data based on a bit depth of the first residual data. The device may generate second residual data at least in part by applying an inverse Adaptive Color Transform (IACT) to the first residual data. Furthermore, the device may reconstruct, based on the second residual data, a coding block of a coding unit (CU) of the video data.

25 Claims, 14 Drawing Sheets

Related U.S. Application Data filed on Feb. 6, 2015, provisional application No. 62/115,487, filed on Feb. 12, 2015.

(51) Int. Cl.

| | |
|---|---|
| H04N 11/02 | (2006.01) |
| H04N 9/64 | (2006.01) |
| H04N 11/24 | (2006.01) |
| H04N 21/2383 | (2011.01) |
| H04N 19/13 | (2014.01) |
| H04N 19/52 | (2014.01) |
| H04N 19/82 | (2014.01) |
| H04N 21/438 | (2011.01) |
| H04N 19/124 | (2014.01) |
| H04N 19/61 | (2014.01) |
| H04N 21/61 | (2011.01) |
| H04N 19/149 | (2014.01) |
| H04N 19/176 | (2014.01) |
| H04N 19/44 | (2014.01) |
| H04N 19/625 | (2014.01) |
| H04N 19/96 | (2014.01) |
| H04N 19/186 | (2014.01) |
| H04N 19/42 | (2014.01) |
| H04N 19/184 | (2014.01) |
| H04N 5/355 | (2011.01) |

(52) U.S. Cl.
CPC ........... *H04N 19/186* (2014.11); *H04N 19/42* (2014.11); *H04N 19/44* (2014.11); *H04N 19/52* (2014.11); *H04N 19/61* (2014.11); *H04N 19/625* (2014.11); *H04N 19/82* (2014.11); *H04N 19/96* (2014.11); *H04N 21/2383* (2013.01); *H04N 21/4382* (2013.01); *H04N 21/6131* (2013.01); *H04N 21/6181* (2013.01); *H04N 5/355* (2013.01); *H04N 19/184* (2014.11)

(56) References Cited

U.S. PATENT DOCUMENTS

| | | | |
|---|---|---|---|
| 2006/0227867 A1 | 10/2006 | Winger et al. | |
| 2014/0355689 A1* | 12/2014 | Tourapis | H04N 19/46 375/240.18 |
| 2015/0117519 A1* | 4/2015 | Kim | H04N 19/136 375/240.02 |
| 2015/0172670 A1* | 6/2015 | Li | H04N 19/136 375/240.08 |
| 2015/0264405 A1* | 9/2015 | Zhang | H04N 19/126 375/240.18 |
| 2016/0100168 A1* | 4/2016 | Rapaka | H04N 19/124 375/240.03 |

OTHER PUBLICATIONS

K. Kawamura, T. Yoshino, & S. Naito, "AHG7: Adaptive colour-space transformation of residual signasl", JCT-VC Document K0193_r1 (Oct. 2012).*

Hsieh et al., "Clipping for Cross Component Prediction and Adaptive Colour Transform," JCT-VC Meeting; Feb. 10-18, 2015; Geneva; (Joint Collaborative Team on Video Coding of ISO/IEC JTC1/SC29/WG11 and ITU-T SG.16 ); http://wftp3.itu.int/av-arch/jctvc-site/; No. JCTVC-T0132, Jan. 31, 2015, 6 pp.

International Search Report and Written Opinion of International Application No. PCT/US2016/015149, dated Apr. 4, 2016, 15 pp.

Joshi, et al., "High Efficiency Video Coding (HEVC) Screen Content Coding: Draft 2," 18th JCT-VC Meeting, Sapporo, JP, Jun. 30-Jul. 9, 2014; Joint Collaborative Team on Video Coding (JCT-VC) of ITU-T SG 16 WP 3 and ISO/IEC JTC 1/SC 29/WG 11, JCTVC-S1005, Dec. 10, 2014, 374 pp. [uploaded in parts].

Yeo, et al., "Dynamic Range Analysis in High Efficiency Video Coding Residual Coding and Reconstruction," IEEE Transactions on Circuits and Systems for Video Technology, Jul. 1, 2013, vol. 23, 1131-1136, US ISSN: 1051-8215, 6 pp.

Zhou: "AHG7: IDCT Output Range after T+Q+IQ+IT with Valid Residual Inputs," JCT-VC Meeting; Mpeg Meeting; Nov. 21, 2011-Nov. 30, 2011; Geneva; (Joint Collaborative Team on Video Coding of ISO/IEC JTC1/SC29/WG11 and ITU-T SG.16 ); Retrieved from: http://wftp3.itu.int/av-arch/jctvc-site/, No. JCTVC-G856; M22429, Nov. 9, 2011, 1 p.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Flynn et al., "High Efficiency Video Coding (HEVC) Range Extensions text specification: Draft 7", Joint Collaborative Team on Video Coding (JCT-VC) of ITU-T SG 16 WP 3 and ISO/IEC JTC 1/SC29/WG11; Mar. 27-Apr. 4, 2014,; 17th Meeting: Valencia, ES, JCTVC-Q1005_v9; Jun. 19, 2014, 363 pp.

Wang et al., "High Efficiency Video Coding (HEVC) Defect Report 4", Joint Collaborative Team on Video Coding (JCT-VC) of ITU-T SG16 WP3 and ISO/IEC JTC1/SC29/WG11, Mar. 27-Apr. 4, 2014, 17th Meeting: Valencia, ES, JCTVC-Q1003_v1, May 28, 2014, 314 pp.

Wang et al., High Efficiency video Coding (HEVC) Defect Report 2, Joint Collaborative Team on Video Coding (JCT-VC) of ITU-T SG16 WP3 and ISO/IEC JTC1/SC29/WG11, 15th Meeting: Geneva, CH, Oct. 1-Nov. 1, 2013, JCTVC-O1003_v2, Nov. 24, 2013, 58 pp.

Joshi et al., High Efficiency Video Coding (HEVC) Screen Content Coding Draft 1, Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R1005_v3, Sep. 27, 2014, 366 pp.

Zhang et al., "SCCE5 Test 3.2.1: In-loop color-space transform", Joint Collaborative Team on Video Coding (JCT-VC) of ITU-T SG16 WP3 and ISO/IEC JTC1/SC29/WG11 18th Meeting: Sapporo, JP, Jun. 30-Jul. 9, 2014, JCTVC-R0147, Jun. 20, 2014, 8 pp.

Response to Written Opinion dated Apr. 4, 2016, from International Application No. PCT/US2016/015149, filed Jul. 11, 2016, 5 pp.

Second Written Opinion of International Application No. PCT/US2016/015149, dated Jan. 17, 2017, 7 pp.

Flynn et al., Overflow in cross component prediction, JCT-VC HEVC, Jan. 7, 2016, 5 pp.

Response to Second Written Opinion dated Jan. 17, 2017, from International Application No. PCT/US2016/015149, filed Feb. 14, 2017, 5 pp.

Zhang et al., SCCE5 Test 3.2.1: In-loop color space transform, Joint Collaborative Team on Video Coding (JCT-VC) of ITU-T SG16 WP3 and ISO/IEC JTC1/SC29/WG11 18th Meeting: Sapporo, Jun. 30-Jul. 9, 2014; JP, JCTVC-R0147-proposed text, Jun. 20, 2014, 13 pp.

Zhang et al., "SCCE5 Test 3.2.1: In-loop color-space transform", Joint Collaborative Team on Video Coding (JCT-VC) of ITU-T SG16 WP3 and ISO/IEC JTC1/SC29/WG11 18th Meeting: Sapporo, JP, Jun. 30-Jul. 9, 2014, JCTVC-R0147, Jun. 20, 2014, 13 Slides.

Flynn et al., "High Efficiency Video Coding (HEVC) Range Extensions text specification: Draft 7", Joint Collaborative Team on Video Coding (JCT-VC) of ITU-T SG 16 WP 3 and ISO/IEC JTC 1/SC29/WG11; Mar. 27-Apr. 4, 2014,; 17th Meeting: Valencia, ES,JCTVC-Q1005_v4; Apr. 10, 2014, 379 pp.

QUALCOMM., "Clipping for ACT", Geneva, Switzerland, Feb. 10-18, 2015, JCTVC-T0132; Jan. 20, 2016, 6 Slides.

Zhou et al., "IDCT output range before clipping of MPEG video coding", Department of Image Processing Heinrich-Hertz-Institut fur Nachrichtentechnik Berlin GmbH, Dec. 2, 2015, 12 pp.

ITU-T H.265, Series H: Audiovisual and Multimedia Systems, Infrastructure of audiovisual services—Coding of moving video, Advanced video coding for generic audiovisual services, the International Telecommunication Union. Apr. 2013, 317 pp.

(56) References Cited

OTHER PUBLICATIONS

ITU-T H.265, Series H: Audiovisual and Multimedia Systems, Infrastructure of audiovisual services—Coding of moving video, Advanced video coding for generic audiovisual services, the International Telecommunication Union. Oct. 2014, 540 pp.

International Preliminary Report on Patentability of International Application No. PCT/US2016/015149, dated Mar. 9, 2017, 22 pp.

* cited by examiner

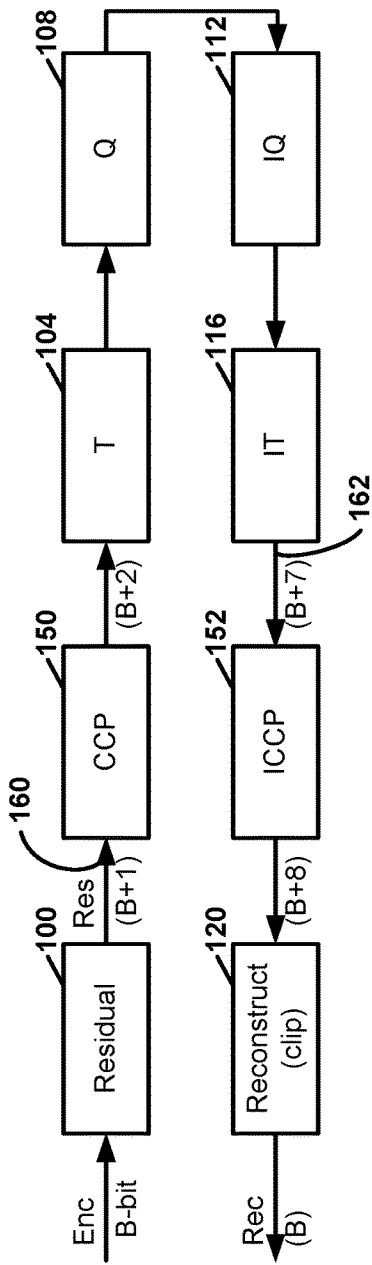
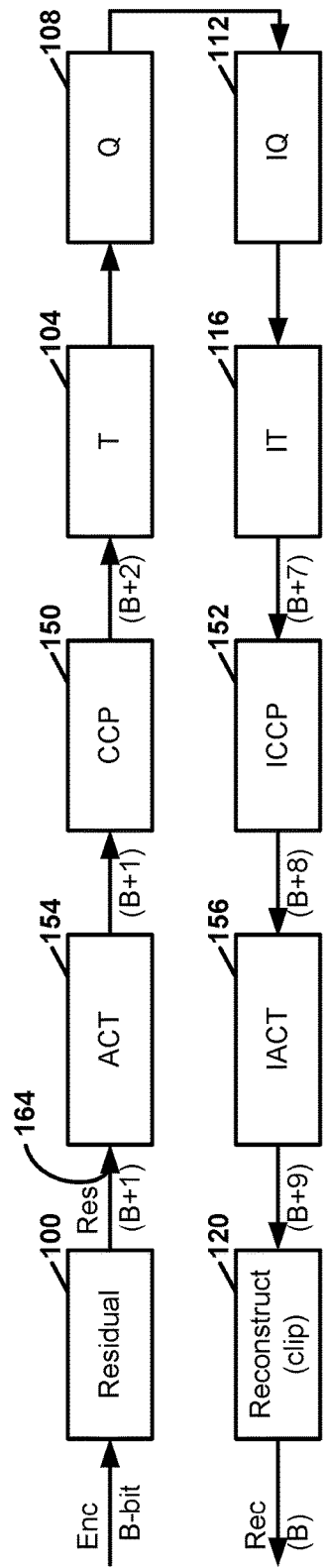
FIG. 4A
FIG. 4B

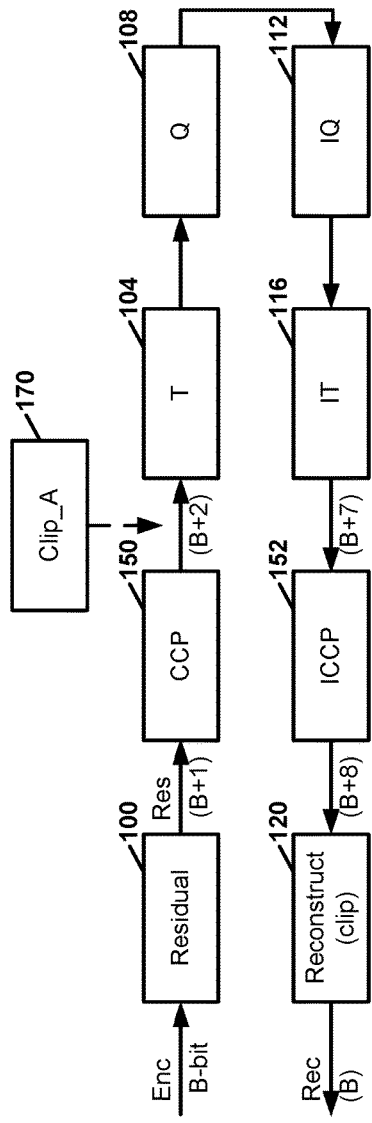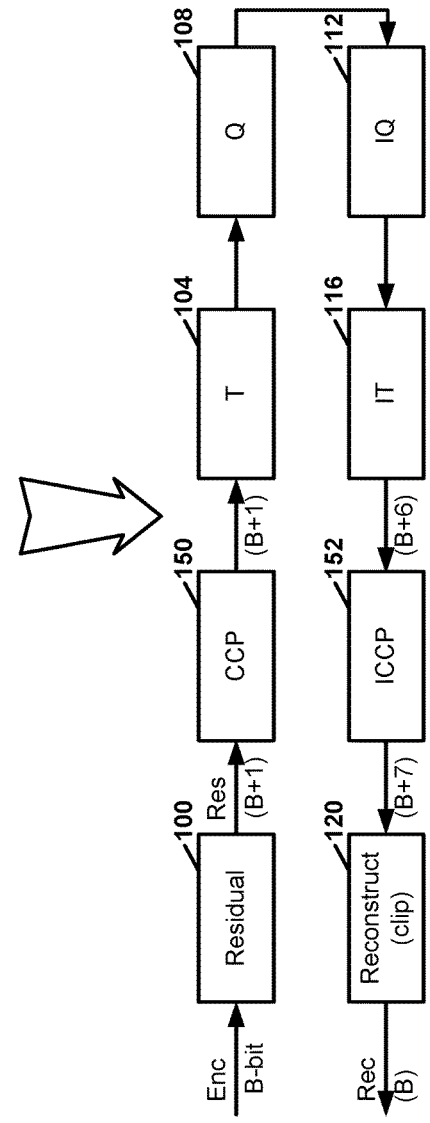
FIG. 5A
FIG. 5B

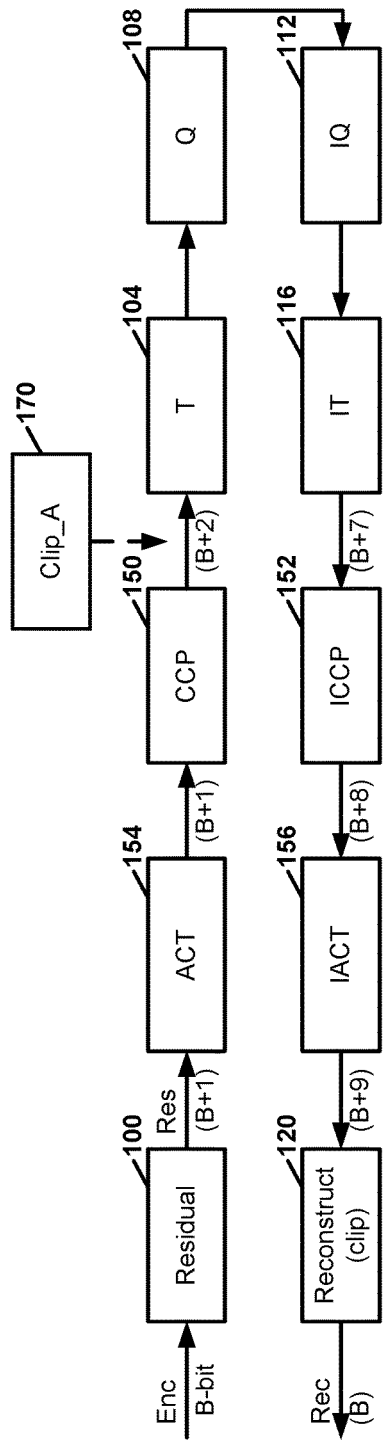
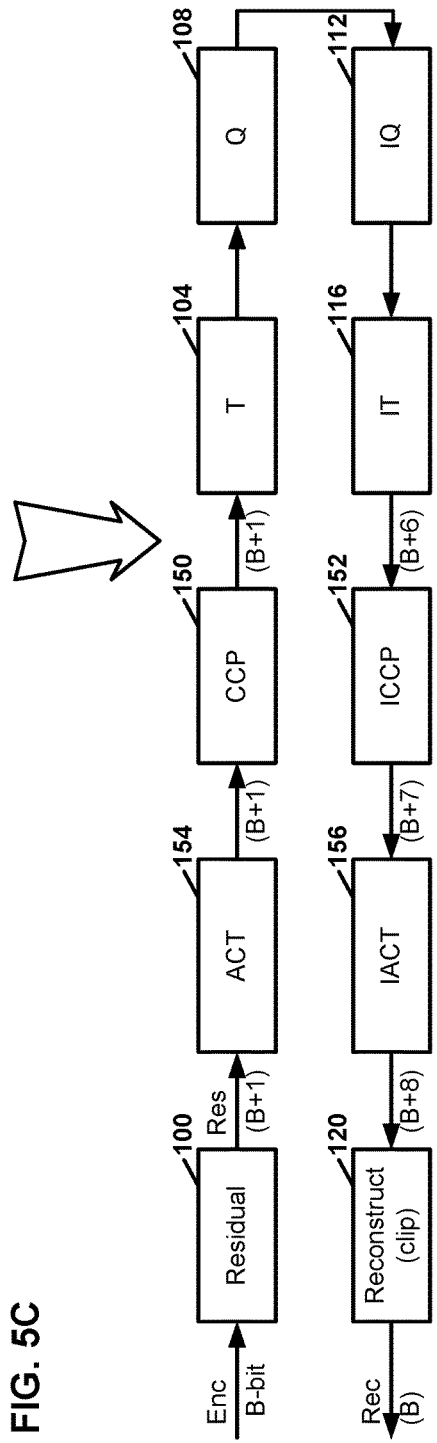
FIG. 5C
FIG. 5D

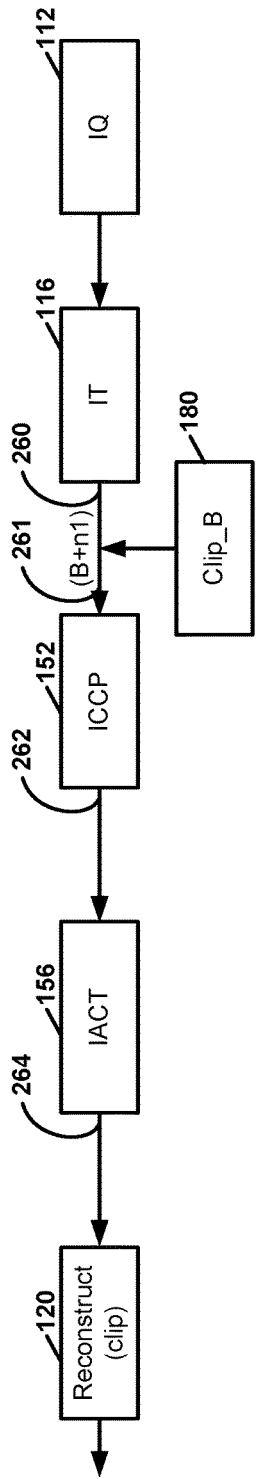
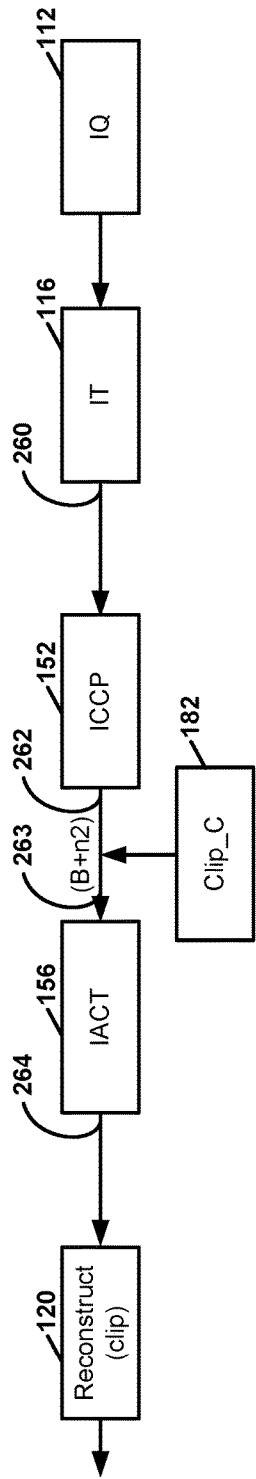
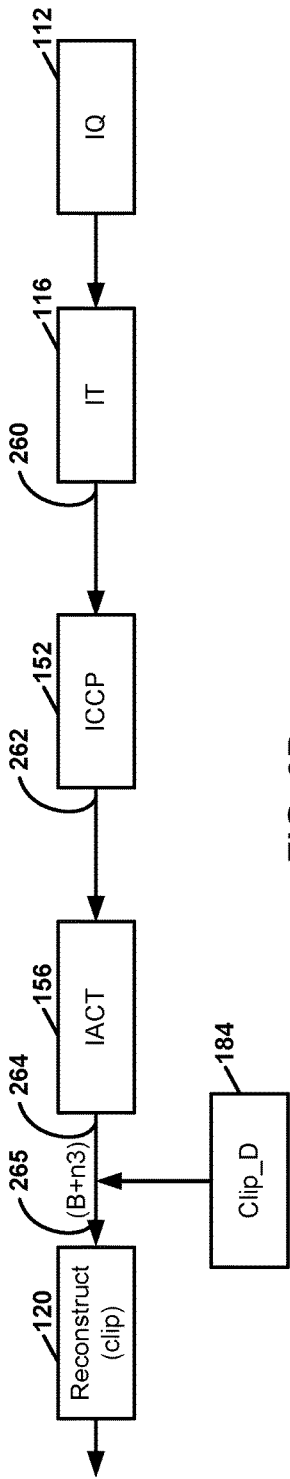
FIG. 6B
FIG. 6C
FIG. 6D

CLIPPING FOR CROSS-COMPONENT PREDICTION AND ADAPTIVE COLOR TRANSFORM FOR VIDEO CODING

This application claims the benefit of U.S. Provisional Patent Application 62/110,324, filed Jan. 30, 2015, U.S. Provisional Patent Application 62/113,269, filed Feb. 6, 2015, and U.S. Provisional Patent Application 62/115,487, filed Feb. 12, 2015, the entire content of each of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards, such as scalable video coding (SVC), multiview video coding (MVC), scalable HEVC (SHVC), multiview HEVC (MV-HEVC), 3D-HEVC, and the HEVC Range Extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding tree units (CTUs), coding units (CUs) and/or coding nodes. Video blocks may include luma blocks and chroma blocks. In an intra-coded (I) slice of a picture, blocks are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients may be entropy coded to achieve even more compression.

SUMMARY

This disclosure is related to the field of video coding, and more particularly is related to bit-depth consideration when tools such as adaptive color transform (ACT) and cross component prediction (CCP) are applied. Particular techniques of this disclosure may reduce, eliminate, or otherwise control the increase in bit depth of samples due to application of ACT and CCP.

In one aspect, this disclosure describes a method of encoding or decoding video data, the method comprising: clipping first residual data to a variable range based on a bit depth of the first residual data; generating second residual data at least in part by applying an inverse Adaptive Color Transform (IACT) to the clipped first residual data; and reconstructing, based on the second residual data, a coding block of a coding unit (CU) of the video data.

In another aspect, this disclosure describes a device for encoding or decoding video data, the device comprising: a memory configured to store the video data; and one or more processors configured to: clip first residual data to a variable range based on a bit depth of the first residual data; generate second inverse transformed residual data at least in part by applying an inverse Adaptive Color Transform (IACT) to the clipped first residual data; and reconstruct, based on the second inverse transformed residual data, a coding block of a coding unit (CU) of the video data In another aspect, this disclosure describes a device for encoding or decoding video data, the device comprising: means for clipping first residual data to a variable range based on a bit depth of the first residual data; means for generating second residual data at least in part by applying an inverse Adaptive Color Transform (IACT) to the clipped first residual data; and means for reconstructing, based on the second inverse transformed residual data, a coding block of a coding unit (CU) of the video data.

In another aspect, this disclosure describes a computer-readable storage medium having stored thereon instructions that, when executed, cause one or more processors of a device for encoding or decoding video data to: clip first residual data to a variable range based on a bit depth of the first residual data; generate second residual data at least in part by applying an inverse Adaptive Color Transform (IACT) to the clipped first residual data; and reconstruct, based on the second residual data, a coding block of a coding unit (CU) of the video data.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 4A is a conceptual diagram illustrating example bit depth information for a configuration of screen content coding using CCP.

FIG. 4B is a conceptual diagram illustrating example bit depth information for a configuration of screen content coding using ACT and CCP.

FIG. 5A is a conceptual diagram illustrating clipping after forward CCP, with CCP only, in accordance with one or more techniques of this disclosure.

FIG. 5B is a conceptual diagram illustrating dynamic range changes attributable to clipping after forward CCP, with CCP only, in accordance with one or more techniques of this disclosure.

FIG. 5C is a conceptual diagram illustrating clipping after forward CCP, with ACT and CCP, in accordance with one or more techniques of this disclosure.

FIG. 5D is a conceptual diagram illustrating dynamic range changes attributable to clipping after forward CCP, with ACT and CCP, in accordance with one or more techniques of this disclosure.

FIG. 6B is a conceptual diagram illustrating an example of clipping at a clipping location indicated in FIG. 6A.

FIG. 6C is a conceptual diagram illustrating an example of clipping at a clipping location indicated in FIG. 6A.

FIG. 6D is a conceptual diagram illustrating an example of clipping at a clipping location indicated in FIG. 6A.

DETAILED DESCRIPTION

Figure 1:
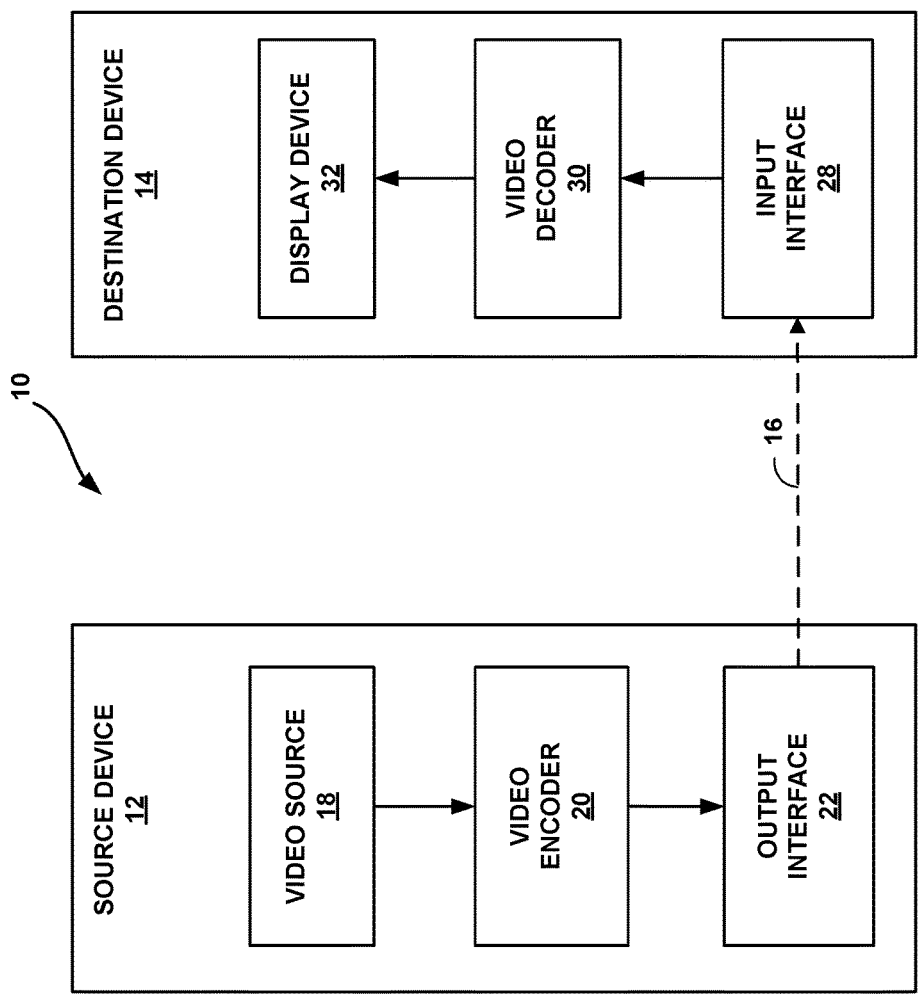
FIG. 1 is a block diagram illustrating an example video coding system that may utilize the techniques of this disclosure.

High Efficiency Video Coding (HEVC) is a recently finalized video coding standard. An extension of HEVC for screen content coding (SCC) is under development. The SCC extension of HEVC implements an adaptive color transform (ACT) and a cross component prediction (CCP) transform to reduce redundancy among color components.

In general, this disclosure relates to the field of video coding, and more particularly relates to bit-depth consideration when tools such as ACT and CCP are applied. The proposed techniques are mainly concerned with SCC, but may be applicable in general to HEVC extensions and other video coding standards, including those that support high bit depths (e.g., more than 8 bits), different chroma sampling formats, and so on.

In the SCC extension of HEVC, a video encoder may generate residual data that indicates differences between samples of a coding block of video data and corresponding samples of a predictive block. The video encoder may then apply the ACT to the residual data to obtain a first set of transformed residual data. The video encoder may then apply the CCP transform to the first set of transformed residual data to obtain a second set of transformed residual data. Subsequently, the video encoder may apply a transform (T), such as a discrete cosine transform (DCT), to the second set of transformed residual data to obtain a third set of transformed residual data. In contrast to the first and second sets of transformed residual data, the third set of transformed residual data may be in a frequency domain instead of a sample domain. Residual data in the "frequency domain" is represented in terms of functions (e.g., cosine or sine functions) oscillating at different frequencies. Residual data in the "sample domain" is represented in terms of values of samples of video data, such as luma or chroma values. The video encoder may then quantize the third set of transformed residual data.

A video decoder may reverse this process. For instance, the video decoder may obtain syntax elements indicative of the quantized third set of transformed residual data. The video decoder may then inverse quantize the third set of transformed residual data to regenerate the third set of transformed residual data. Next, the video decoder may apply an inverse transform (IT), such as an inverse DCT, to regenerate the second set of transformed residual data. The video decoder may then apply an inverse CCP (ICCP) transform to the regenerated second set of transformed residual data to regenerate the first set of transformed residual data. Subsequently, the video decoder may apply an inverse ACT (IACT) to the regenerated first set of transformed residual data to regenerate the residual data. The video decoder may reconstruct the coding block based on the regenerated residual data and a predictive block.

In the process outlined above, each sample of the regenerated second set of transformed residual data (i.e., the output of the IT) has a bit depth 7 bits greater than the original bit depth of the samples of the coding block. In this context, the term "bit depth" refers to the number of bits used to represent a single sample. Furthermore, each sample of the regenerated second set of transformed residual data (i.e., the output of the ICCP transform) has a bit depth 8 bits greater than the original bit depth of the samples of the coding block. Each sample of the regenerated first set of transformed residual data (i.e., the output of the IACT) has a bit depth 9 bits greater than the original bit depth of the samples of the coding block.

The increase in bit depth associated with using the ACT and CCP transform may increase implementation complexity and costs for video encoders and video decoders. For instance, in hardware implementations of video encoders and video decoders, data paths for carrying and storing samples of the transformed residual data may require more channels and/or storage locations.

This disclosure describes several techniques that reduce or eliminate the increase in bit depth associated with using the ACT and CCP transform in video coding. For example, as part of a process to decode video data, a video decoder may clip first residual data to a variable range based on a bit depth of the first residual data. Clipping may refer to the process of setting a value to an upper limit value if the value exceeds the upper limit value or setting the value to a lower limit value if the value is less than the lower limit value. In some examples, the video decoder may apply an ICCP to generate the first residual data. In some examples, the video decoder may apply a transform from a transform domain to a sample domain to generate the first residual data, without applying an ICCP. Next, the video decoder may generate second residual data at least in part by applying the IACT to the clipped input. Thus, the video decoder may clip the input to the IACT based on a bit depth of the input to the IACT. The video decoder may reconstruct, based on the second residual data, a coding block of a coding unit (CU) of the video data. For instance, the video decoder may reconstruct the coding block of the CU such that, for each respective sample of the coding block corresponding to a sample in the second residual data, the respective sample of the coding block is equal to the corresponding sample in the second residual data plus a corresponding sample in a predictive block of a prediction unit (PU) of the CU. A video encoder may perform the same or similar process as part of the reconstruction loop (i.e., decoding loop) of the video encoder. Advantageously, the process described in this example may prevent the bit depth from increasing beyond a particular number when using ACT and/or CCP.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for video coding in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory. Video encoder 20 and video decoder 30 may comprise memories configured to store video data. Video encoder 20 may encode the video data stored in the memory. Video decoder 30 may decode encoded video data and store the resulting video data in the memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternatively, such communication may occur over a span of time, such as might occur when storing syntax elements to a computer-readable storage medium in an encoded bitstream at the time of encoding, which then may be retrieved by a decoding device at any time after being stored to this medium.

In the example of FIG. 1, source device 12 and destination device 14 may each comprise a wireless communication device. Source device 12 may comprise a transmitter communicatively coupled to one or more processors of source device 12. In other words, the one or more processors of source device 12 may be coupled to the transmitter directly or indirectly in a way that allows the one or more processors of source device 12 to communicate with the transmitter. Output interface 22 may comprise the transmitter. The transmitter may be configured to transmit a bitstream that comprises an encoded representation of video data. For instance, this encoded representation of the video data may comprise an encoded representation of a coding unit. Similarly, destination device 14 may comprise a receiver communicatively coupled to one or more processors of destination device 14. In other words, the one or more processors of destination device 14 may be coupled to the receiver directly or indirectly in a way that allows the one or more processors of destination device 14 to communicate with the receiver. Input interface 28 may comprise the receiver. The receiver may be configured to receive a bitstream that comprises the encoded representation of video data. In some examples, the wireless communication device is a cellular telephone, the bitstream is modulated according to a cellular communication standard. In such examples, the bitstream may be transmitted by the transmitter, or the bitstream may be received by the receiver.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). In some examples, video encoder 20 and video decoder 30 operate according to a video compression standard, such as the HEVC standard. Wang et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, document JCTVC-O1003_v2, available from http://phenix.int-evey.fr/jct/doc_end_user/documents/15_Geneva/wg11/JCTVC-O1003-v2.zip, is an HEVC draft specification and is referred to as the HEVC WD hereinafter. Wang et al., "High Efficiency Video Coding (HEVC) Defect Report 4," Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, document JCTVC-Q1003 (v.1), available from http://phenix.int-evey.fr/jct/doc_end_user/documents/17_Valencia/wg11/JCTVC-Q1003-v1.zip (hereinafter, HEVC version 1) is another document describing the HEVC standard. Recommendation ITU-T H.265, High Efficiency Video Coding, available from http://www.itu.int/rec/T-REC-H.265-201304-I, is another document containing the latest HEVC specification. In addition to the base HEVC standard, there are ongoing efforts to produce scalable video coding, multiview video coding, and 3D coding extensions for HEVC.

The HEVC Range Extension, which is another extension to the HEVC standard, adds support to HEVC for additional color representations (also referred to as "color formats"), as well as for increased color bit-depth. The Range Extensions to HEVC, which may be referred to as "HEVC RExt," are also being developed by the JCT-VC. A recent draft of the HEVC Range Extension is: Flynn et al., "High Efficiency Video Coding (HEVC) Range Extensions text specification: Draft 7," Joint Collaborative Team on Video Coding (JCT-VC) of ITU-T SG 16 WP 3 and ISO/IEC JTC 1/SC 29/WG 11, 17$^{th}$ Meeting: Valencia, ES, 27 Mar.-4 Apr. 2014, JCTVC-Q1005_v9, which is available from http://phenix-.int-evey.fr/jct/doc_end_user/documents/17_Valencia/wg11/JCTVC-Q1005-v9.zip. Another recent Working Draft (WD) of the HEVC Range Extensions, referred to as RExt WD7 hereinafter, is described in Flynn et al., "High Efficiency Video Coding (HEVC) Range Extensions text specification: Draft 7," Joint Collaborative Team on Video Coding (JCT-VC) of ITU-T SG 16 WP 3 and ISO/IEC JTC 1/SC 29/WG 11, 17$^{th}$ Meeting: Valencia, ES, 27 Mar.-4 Apr. 2014, which is available from http://phenix.int-evey.fr/jct/doc_end_user/documents/17_Valencia/wg11/JCTVC-Q1005-v4.zip.

As indicated above, the HEVC Range Extensions may add support to HEVC for increased color bit-depth. A color bit-depth is the number of bits used to represent each component of a color representation. The support for other color formats may include support for encoding and decoding Red-Green-Blue (RGB) sources of video data, as well as video data having other color representations and using different chroma sub sampling patterns than the HEVC main profile.

The range extension specification may become version 2 of the HEVC. However, in a large extent, as far as the proposed techniques of this disclosure are concerned, e.g., motion vector prediction, HEVC version 1 and the HEVC Range Extensions specification are technically similar. Therefore, whenever this disclosure refers to changes based on HEVC version 1, the same changes may apply to the HEVC Range Extensions specification, and whenever this disclosure reuses the HEVC version 1 module, this disclosure may also actually be reusing the HEVC Range Extension module (with the same sub-clauses).

Another extension of HEVC, namely screen content coding (SCC), for coding screen-content material such as text and graphics with motion is also being developed. A recent Working Draft (WD) of SCC, Joshi et al., "High Efficiency Video Coding (HEVC) Screen Content Coding: Draft 1," Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, document JCTVC-R1005_v3 (hereinafter, "JCTVC-R1005") is available from http://phenix.int-evry.fr/jct/doc_end_user/documents/18_Sapporo/wg11/JCTVC-R1005-v3.zip.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). A slice may include an integer number of CTUs ordered consecutively in the raster scan.

To generate an encoded CTU, video encoder 20 may recursively perform quad-tree partitioning on the coding tree blocks of a CTU to divide the coding tree blocks into coding blocks, hence the name "coding tree units." A coding block is an N×N block of samples. A coding unit (CU) may be a coding block of luma samples and two corresponding coding blocks of chroma samples of a picture that has a luma sample array, a Cb sample array and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive blocks (e.g., predictive luma, Cb and Cr blocks) for one or more PUs of a CU, video encoder 20 may generate a residual block of the CU. Each sample in a residual block of the CU indicates a difference between a sample in a predictive block for a PU of the CU and a corresponding sample in a coding block of the CU. For example, video encoder 20 may generate a luma residual block of the CU. Each sample in the luma residual block of the CU indicates a difference between a luma sample in a predictive luma block of a PU of the CU and a corresponding sample in the luma coding block of the CU. In addition, video encoder 20 may generate a Cb residual block of the CU. Each sample in the Cb residual block of the CU may indicate a difference between a Cb sample in a predictive Cb block of a PU of the CU and a corresponding sample in the Cb coding block of the CU. Video encoder 20 may also generate a Cr residual block of the CU. Each sample in the Cr residual block of the CU may indicate a difference between a Cr sample in a predictive Cr block for a PU of the CU and a corresponding sample in the Cr coding block of the CU.

Furthermore, video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block for a TU to generate a coefficient block for the TU. For example, video encoder 20 may apply one or more transforms to a luma transform block for a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. A coefficient block may be a two-dimensional array of transform coefficients. A transform coefficient may be a scalar quantity.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. The bitstream may comprise an encoded representation of video data.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units.

In the example of FIG. 1, video decoder 30 receives a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use intra prediction or inter prediction to determine predictive blocks of the PUs of a current CU. In addition, video decoder 30 may inverse quantize coefficient blocks for TUs of the current CU. Video decoder 30 may perform inverse transforms on the coefficient blocks to regenerate transform blocks for the TUs of the current CU. Video decoder 30 may reconstruct the coding blocks of the current CU by adding the samples of the predictive blocks for PUs of the current CU to corresponding samples of the transform blocks for the TUs of the current CU. By reconstructing the coding blocks for each CU of a picture, video decoder 30 may reconstruct the picture.

The pixels of each block of video data each represent color in a particular format, referred to as a "color representation." Different video coding standards may use different color representations for blocks of video data. As one example, the main profile of the HEVC video standard uses the YCbCr color representation to represent the pixels of blocks of video data.

The YCbCr color representation generally refers to a color representation in which each pixel of video data is represented by three components or channels of color information, "Y," "Cb," and "Cr." The Y channel represents luminance (i.e., light intensity or brightness) data for a particular pixel. The Cb and Cr components are the blue-difference and red-difference chrominance, i.e., "chroma," components, respectively. YCbCr is often used to represent color in compressed video data because there is strong decorrelation between each of the Y, Cb, and Cr components, meaning that there is little data that is duplicated or redundant among each of the Y, Cb, and Cr components. Coding video data using the YCbCr color representation therefore offers good compression performance in many cases.

Additionally, many video coding techniques utilize a technique, referred to as "chroma subsampling" to further improve compression of color data. Chroma sub-sampling of video data having a YCbCr color representation reduces the number of chroma values that are signaled in a coded video bitstream by selectively omitting chroma components according to a pattern. In a block of chroma sub-sampled video data, there is generally a luma value for each pixel of the block. However, the Cb and Cr components may only be signaled for some of the pixels of the block, such that the chroma components are sub-sampled relative to the luma component.

A video coder (i.e., a video encoder or a video decoder) may interpolate Cb and Cr components for pixels where the Cb and Cr values are not explicitly signaled for chroma sub-sampled blocks of pixels. Chroma sub-sampling works well to reduce the amount of chrominance data without introducing distortion in blocks of pixels that are more uniform. Chroma sub-sampling works less well to represent video data having widely differing chroma values, and may introduce large amounts of distortion in those cases.

As mentioned above, the HEVC main profile uses YCbCr because of the generally strong color decorrelation between the luma component, and the two chroma components of the color representation (also referred to as a color format). However, in some cases, there may still be correlations among Y, Cb, and Cr components. The correlations between components of a color representation may be referred to as cross-color component correlation or inter-color component correlation.

A video coder may be configured to predict the value of one component (e.g., a sample of a chroma component) based on the value of a different component (e.g., a sample of a luma component). The process of predicting samples from a first component based on a second component is referred to as "cross-component prediction for color video" or "inter-color component prediction." A video coder may predict the value of the first component based on the correlation between the first component and the second component.

When video data is captured, it is often converted to the RGB color space for various preprocessing purposes. After preprocessing, for video coding, the video data is usually converted into YCbCr 4:2:0 for better compression efficiency. However, the color conversion can cause color distortion leading to subjective quality degradation. The Range Extensions of HEVC provide for video coding for color spaces other than YCbCr 4:2:0, such as YCbCr 4:2:2, YCbCr 4:4:4, and RGB 4:4:4.

If RGB data is directly compressed without color transform (e.g., color conversion), coding efficiency may be reduced because the redundancies between color channels are not reduced. On the other hand, traditional color conversion like YCbCr may cause color distortion. Therefore, it may be desirable to develop technology that can achieve coding efficiency improvement with less color distortion.

HEVC's screen content coding (SCC) employs two coding tools to exploit the redundancy among three color components to achieve higher compression ratio, namely adaptive color transform (ACT), and cross component prediction (CCP). As described in L. Zhang et al., "SCCE5 Test 3.2.1: In-loop color-space transform," Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, document JCTVC-R0147 (hereinafter, "JCTVC-R0147"), ACT is an in-loop color-space transform whose forward and inverse color-space transforms for lossy coding use the YCoCg transform matrices, which are defined as follows:

$$\text{Forward: } \begin{bmatrix} C'_0 \\ C'_1 \\ C'_2 \end{bmatrix} = \begin{bmatrix} 1 & 2 & 1 \\ 2 & 0 & -2 \\ -1 & 2 & -1 \end{bmatrix} \begin{bmatrix} C_0 \\ C_1 \\ C_2 \end{bmatrix} / 4$$

$$\text{Inverse: } \begin{bmatrix} C_0 \\ C_1 \\ C_2 \end{bmatrix} = \begin{bmatrix} 1 & 1 & -1 \\ 1 & 0 & 1 \\ 1 & -1 & -1 \end{bmatrix} \begin{bmatrix} C'_0 \\ C'_1 \\ C'_2 \end{bmatrix}$$

In the equations above, the original color space (C0, C1, C2) may correspond to (R, G, B) or (Y, U, V).

CCP is a process to predict chroma (or 2nd and 3rd components) from the luma (or 1st component). CCP is described in R. Joshi and J. Xu, "High efficient video coding (HEVC) screen content coding: Draft 2," JCTVC-S1005, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014 (hereinafter, "JCTVC-S1005"). Equations for CCP are shown as follows:

Forward:

$Y=Y$ $\Delta C_g = C_g - (\alpha_{C_g} \times Y) >> 3$ $\Delta C_o = C_o - (\alpha_{C_o} \times Y) >> 3$ Inverse:

$Y=Y$ $C_g = (\alpha_{C_g} \times Y) >> 3 + \Delta C_g$ $C_o = (\alpha_{C_o} \times Y) >> 3 + \Delta C_o$ where a could be $\{-8, -4, -2, -1, 0, 1, 2, 4, 8\}$.

Figure 2:
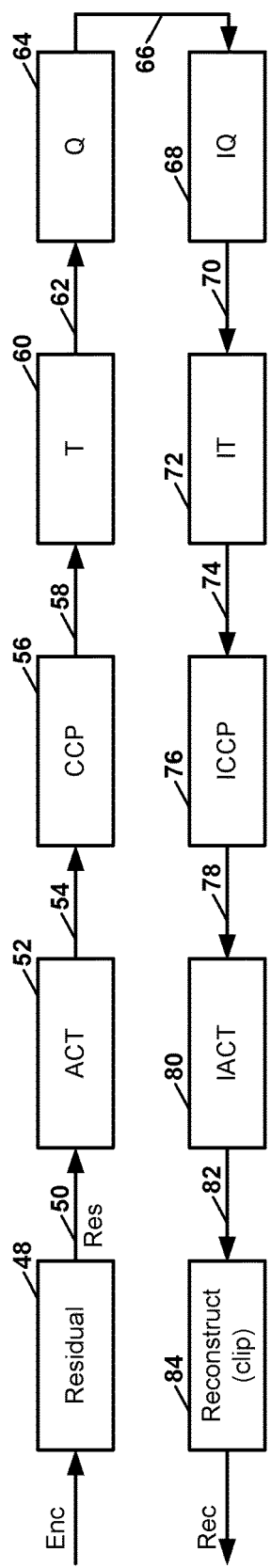
FIG. 2 is a conceptual diagram illustrating an example Adaptive Color Transform (ACT) and Cross-Component Prediction (CCP) processing order.

FIG. 2 is a conceptual diagram illustrating an example ACT and CCP processing order. Both ACT and CCP are residual based operations, and their corresponding processing order within a codec is shown in FIG. 2. In the example of FIG. 2, a video encoder (abbreviated "Enc" in FIG. 2) performs a residual generation operation 48 to obtain residual data 50 (e.g., in the manner described elsewhere in this disclosure). Residual data 50 is abbreviated as "Res" in FIG. 2. Furthermore, in FIG. 2, the video encoder applies an ACT 52 to residual data 50, thereby obtaining residual data 54. Next, the video encoder applies a CCP transform 56 to residual data 54, thereby obtaining residual data 58. The video encoder then applies a transform 60 to residual data 58, thereby obtaining residual data 62. Residual data 62 may be in a transform domain, such as a frequency domain. Furthermore, the video encoder may apply a quantization operation 64 to residual data 62, thereby obtaining quantized residual data 66.

In FIG. 2, a video decoder applies an inverse quantization operation 68 to quantized residual data 66, thereby obtaining inverse quantized residual data 70. Next, the video decoder applies an inverse transform 72 to inverse quantized residual data 70, thereby obtaining residual data 74. Residual data 74 may be in the sample domain. Furthermore, the video decoder applies an inverse CCP transform (ICCP) 76 to residual data 74, thereby obtaining residual data 78. Next, the video decoder applies an inverse ACT (IACT) 80 to residual data 78, thereby obtaining residual data 82. The video decoder may apply a reconstruction operation 84 based in part on residual data 82 to reconstruct a coding block. A video encoder may perform the portions of FIG. 2 described with regard to the video decoder as part of a decoding loop.

The dynamic range analysis along HEVC data paths have been studied in detail in C. Yeo et al., "Dynamic Range Analysis in High Efficiency Video Coding Residual Coding and Reconstruction," IEEE Trans. Circuits Syst. Video Technol., vol. 23, no. 7, pp. 1131-1136, July. 2013, and M. Zhou, "AHG7: IDCT Output Range After T+Q+IQ+IT With Valid Residual Inputs," Joint Collaborative Team on Video Coding (JCT-VC) of ITU-T SG16 WP3 and ISO/IEC JTC1/SC29/WG11, 7th Meeting: Geneva, CH, 19-30, Nov. 2011, document JCTVC-G856.

Figure 3:
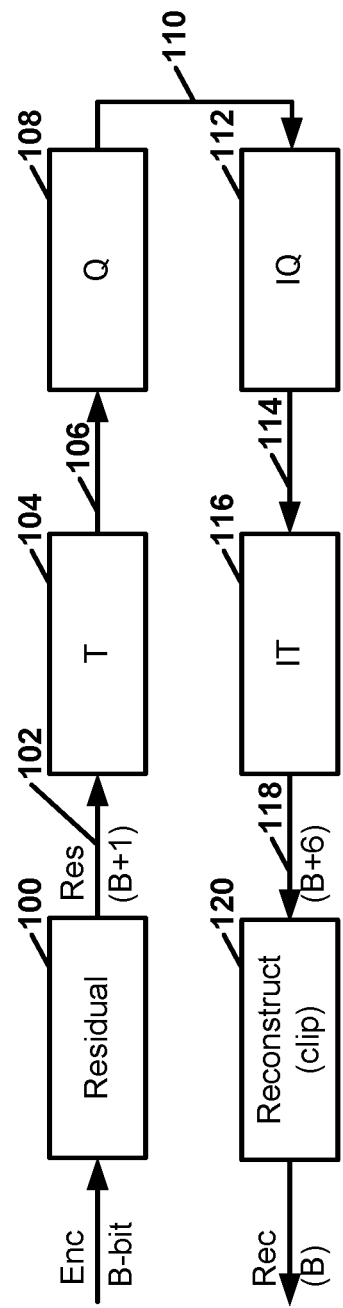
FIG. 3 is a conceptual diagram illustrating example High Efficiency Video Coding (HEVC) coded input/output (TO) bit depths.

FIG. 3 is a conceptual diagram illustrating example HEVC coded input/output (IO) bit depths. As illustrated in FIG. 3, up to 5 bits of bit-depth expansion can occur in the reconstructed residual where B-bit is the bit-depth of input pixels and prediction pixels. Particularly, in FIG. 3, a video encoder may perform a residual generation operation 100 to obtain residual data 102 (abbreviated "Res" in FIG. 3). Each sample of residual data 102 may have a bit depth of B+1. Next, in FIG. 3, the video encoder may apply a transform 104 to residual data 102 to obtain residual data 106. The video encoder may apply a quantization operation 108 to residual data 106, thereby obtaining quantized residual data 110.

In FIG. 3, a video decoder may apply an inverse quantization operation 112 to quantized residual data 110, thereby obtaining inverse quantized residual data 114. Next, the video decoder may apply an inverse transform (IT) 116 to inverse quantized residual data 114, thereby obtaining inverse transformed (e.g., inverse discrete cosine transform or inverse sine transform) residual data 118. IT 116 may transform residual data from a transform domain to a sample domain (i.e., a pixel domain). As shown in FIG. 3, as a result of applying inverse transform 116, each sample of residual data 118 may have a bit depth of B+6. Furthermore, in FIG. 3, the video decoder may apply a reconstruction operation 120 to residual data 118 to reconstruct samples of a coding block. In FIG. 3, the video decoder may apply a clipping operation as part of performing reconstruction operation 120. The clipping operation may ensure the bit depth of the reconstructed samples of the coding block is equal to B.

FIG. 4A is a conceptual diagram illustrating example bit depth information for a configuration of screen content coding using CCP. FIG. 4B is a conceptual diagram illustrating example bit depth information for a configuration of screen content coding using ACT and CCP. FIG. 4A and FIG. 4B are similar to FIG. 3 but with the inclusion of CCP and, in FIG. 4B, ACT. In FIG. 4A, the video encoder applies a CCP transform 150 to residual data 160 and a video decoder (or video encoder reconstruction loop) applies an inverse CCP transform 152 to residual data 162 obtained by IT 116. In FIG. 4B, the video encoder applies an ACT 154 to residual data 164, followed by CCP transform 150 and a video decoder (or video encoder reconstruction loop) applies inverse CCP transform 152 followed by inverse ACT 156.

Considering ACT and CCP operations of SCC, the dynamic range expansion is shown in FIG. 4A and FIG. 4B, where IACT stands for Inverse ACT and ICCP stands for Inverse CCP. From the FIG. 4A and FIG. 4B, it is clear that bit-depth after Inverse Transform (IT) 116 is increased to (B+7) bits which is due to addition of forward CCP operation 150 and, in FIG. 4B, forward ACT operation 154. This could increase the bit depth of the chroma residual (or residual delta) one more bit to (B+2) bits. Because CCP is applied only to the chroma residual data using luma residual data, the bit depth of the luma residual data is unchanged by CCP.

As can be seen from the bit depth analysis in FIG. 4A and FIG. 4B, the bit depth increase at the input of the transform may have dynamic range impacts along the data path, like in a transpose buffer, ICCP, and IACT, which could result in higher implementation cost, and in general may not be desirable in the implementation. The terms "dynamic range" and "bit depth" may be used interchangeably in this disclosure.

This disclosure proposes techniques that may keep bit depth unchanged or may reduce bit depth increase when ACT and CCP tools are enabled. For instance, in a first example of this disclosure, it is proposed that a clipping operation at the video encoder be applied after the forward CCP operation as Clip_A shown in FIG. 5A and FIG. 5B. This disclosure proposes to clip the dynamic range of the output of the CCP to B+1 bits, where B-bit is the bit-depth of input pixels and prediction pixels so the dynamic range of the output of the CCP can be brought back to the limits indicated in HEVC version 2 (Recommendation ITU-T H.265, October 2014). Potential benefits of the techniques of this disclosure may include: no need to change decoder side, and maintenance of the dynamic range of original data paths, which may mean the existing design does not need to change its bit depth along the data path.

FIG. 5A is a conceptual diagram illustrating clipping after forward CCP, with CCP only, in accordance with one or more techniques of this disclosure. FIG. 5B is a conceptual diagram illustrating dynamic range changes attributable to clipping after forward CCP, with CCP only, in accordance with one or more techniques of this disclosure. In the example of FIG. 5A, video encoder 20 performs a clipping operation 170 on the output of CCP 150. As shown in the example of FIG. 5B, the result of performing clipping operation 170 is that the bit depth of the input to transform 104 is B+1 bits instead of B+2 bits. Furthermore, as shown in the example of FIG. 5B, as a result of performing clipping operation 170, the input to ICCP transform 152 is B+6 bits instead of B+7 bits. Similarly, as shown in the example of FIG. 5B, as a result of performing clipping operation 170, the input to reconstruction operation 120 is B+7 bits instead of B+8 bits.

Hence, in the example of FIG. 5A and FIG. 5B, video encoder 20 may generate, based on original samples of a coding block and samples of one or more predictive blocks, residual data for a CU of the video data. Additionally, video encoder 20 may generate transformed residual data by applying a CCP transform to the residual data. After applying the CCP transform to the residual data, video encoder 20 may apply a clipping operation to the transformed residual data. In the example of FIG. 5A and FIG. 5B, video encoder 20 may perform the clipping operation such that a bit depth of each sample of the transformed residual data is B+1 bits, where B is a bit depth of the original samples of the coding block.

FIG. 5C is a conceptual diagram illustrating clipping after forward CCP, with ACT and CCP, in accordance with one or more techniques of this disclosure. FIG. 5D is a conceptual diagram illustrating dynamic range changes attributable to clipping after forward CCP, with ACT and CCP, in accordance with one or more techniques of this disclosure. In the example of FIG. 5C, video encoder 20 performs a clipping operation 170 on the output of CCP 150. As shown in the example of FIG. 5D, the result of performing clipping operation 170 is that the bit depth of the input to transform 104 is B+1 bits instead of B+2 bits. Furthermore, as shown in the example of FIG. 5D, as a result of performing clipping operation 170, the input to ICCP transform 152 is B+6 bits instead of B+7 bits. Similarly, as shown in the example of FIG. 5D, as a result of performing clipping operation 170, the input to IACT 156 is B+7 bits instead of B+8 bits. Further, as shown in the example of FIG. 5B, as a result of performing clipping operation 170, the input of reconstruction operation 120 is B+8 bits instead of B+9 bits.

Hence, in the example of FIG. 5C and FIG. 5D, video encoder 20 may generate, based on original samples of a coding block and samples of one or more predictive blocks, residual data for a CU of the video data. Additionally, video encoder 20 may generate first residual data by applying an adaptive color transform to the residual data. After generating the first residual data, video encoder 20 may generate second residual data by applying a CCP transform to the first residual data. After applying the CCP transform to the first residual data, video encoder 20 may apply a clipping operation to the second residual data. In the example of FIG. 5C and FIG. 5D, video encoder 20 may perform the clipping operation such that a bit depth of each sample of the residual data is B+1 bits, where B is a bit depth of the original samples of the coding block.

Figure 6A:
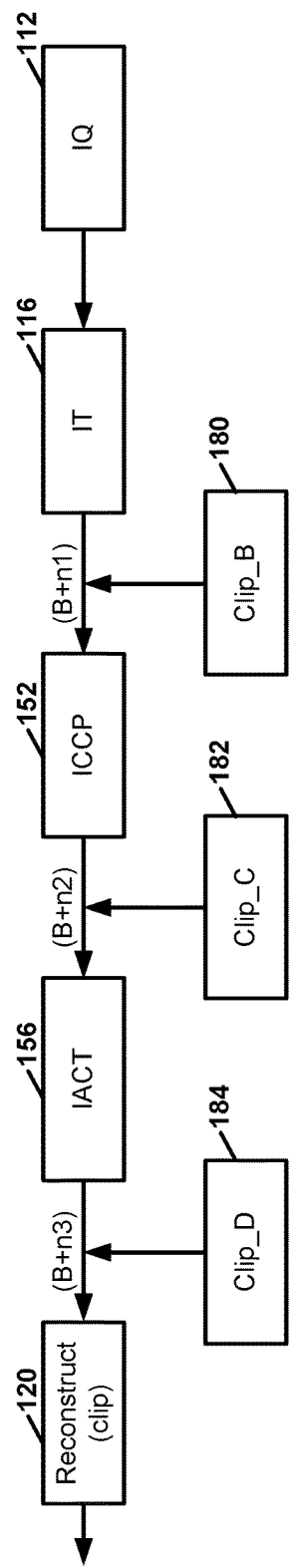
FIG. 6A is a conceptual diagram illustrating example clipping locations at a video decoder, in accordance with one or more techniques of this disclosure.

In accordance with a second example of this disclosure, it is proposed to clip the dynamic range of the input to ICCP to B+n1 bits, where B-bit is the bit-depth of input pixels and prediction pixels, and n1 could be 1 to 6 which is dependent on previous stage's results' dynamic range and the performance requirements. FIG. 6A is a conceptual diagram illustrating example clipping locations (Clip_B, Clip_C, and Clip_D) at video decoder 30, in accordance with one or more techniques of this disclosure. FIG. 6B, FIG. 6C, and FIG. 6D are conceptual diagrams illustrating example clipping at the clipping locations indicated in FIG. 6A.

In the example of FIG. 6A and FIG. 6B, a clipping operation 180 for clipping the dynamic range of the input to ICCP 152 to B+n1 bits is shown as Clip_B. For instance, since Clip_B is applied to the inverse CCP input at the decoder side, the modification to add Clip_B may not be compatible with the range extension (RExt) decoder, where such clipping is not present and is not needed. Thus, while it may desirable for the SCC decoder to be able to decode range extension bitstreams, such modification may not be suited for the SCC standard. The clipping locations shown in FIG. 6A may also be present in the decoding loop of video encoder 20.

Thus, in accordance with the second example of this disclosure, shown in FIG. 6B, video decoder 30 may generate residual data 260 by applying inverse transform 116. IT 116 may convert residual data from a transform domain to a sample value domain. For instance, IT 116 may be an inverse cosine transform or an inverse sine transform. Furthermore, after applying IT 116 to generate residual data 260, video decoder 30 may generate clipped residual data 261 by applying clipping operation 180 to residual data 260. After applying clipping operation 180 to residual data 260, video decoder 30 may generate residual data 262 by applying ICCP 152 transform to clipped residual data 261. Video decoder 30 may reconstruct, based on residual data 262, a coding block of a CU of the video data. In some instances, as part of reconstructing the coding block, video decoder 30 may generate residual data 264 by applying IACT 156 to residual data 262 and may generate, based on residual data 264, the coding block of the CU. In this example, as part of generating clipped residual data 261, video decoder 30 may clip residual data 260 such that a bit depth of each sample of residual data 260 is B+n1 bits, where B is a bit depth of samples of the coding block and n1 is a value in a range of 1 to 6. In some such examples, the value of n1 is dependent on a dynamic range of the first inverse transform. This example may also be performed as part of the decoding loop of video encoder 20.

In a third example of this disclosure, shown in FIG. 6B, it is proposed to clip the dynamic range of the input to IACT 156 to B+n2 bits, where B-bit is the bit-depth of input pixels and prediction pixels, and the embodiment for n2 could be 1 to 7 which is dependent on previous stage's results' dynamic range and the performance requirements. In this example, the clipping location is Clip_C shown in FIG. 6. In other words, in the example of FIG. 6A, a clipping operation 182 for clipping the dynamic range of the input to IACT 152 to B+n2 bits is shown as Clip_C.

Thus, in accordance with the third example of this disclosure, video decoder 30 may generate residual data 260 by applying IT 116. After generating residual data 260, video decoder 30 may generate residual data 262 by applying ICCP transform 152 to residual data 260. After generating residual data 262, video decoder 30 may generate clipped residual data 263 by applying clipping operation 182 to residual data 262. Furthermore, in this example, video decoder 30 may generate residual data 264 by applying IACT 156 to clipped residual data 263. In this example, video decoder 30 may reconstruct, based on residual data 264, a coding block of a CU of the video data. In this example, as part of generating clipped residual data 263, video decoder 30 may clip residual data 262 such that a bit depth of each sample of residual data 262 is B+n2 bits, where B is a bit depth of samples of the coding block and n1 is a value in a range of 1 to 7. Furthermore, in this example, the value of n2 may be dependent on a dynamic range of ICCP 152. This example may also be performed as part of the decoding loop of video encoder 20.

In a fourth example of this disclosure, shown in FIG. 6D, it is proposed to clip the dynamic range of the output of IACT 156 to B+n3 bits, where B-bit is the bit-depth of input pixels and prediction pixels, and examples of n3 may be 1 to 8, which may be dependent on previous stage's results' dynamic range and the performance requirements. In this example, the clipping location is Clip_D shown in FIG. 6A and FIG. 6D. In other words, in the example of FIGS. 6A and 6D, a clipping operation 184 for clipping the dynamic range of the input to IACT to B+n2 bits is shown as Clip_D.

Thus, in accordance with the fourth example of this disclosure, video decoder 30 may generate residual data 260 by applying IT 116. After generating residual data 260, video decoder 30 may generate residual data 262 by applying ICCP transform 152 to residual data 260. After generating residual data 262, video decoder 30 may generate residual data 264 by applying IACT 156 to residual data 262. After generating residual data 264, video decoder 30 may generate clipped residual data 265 by applying a clipping operation 184 to residual data 264. In this example, video decoder 30 may reconstruct, based on clipped residual data 265, a coding block of a CU of the video data. In this example, as part of generating clipped residual data 265, video decoder 30 may clip residual data 264 such that a bit depth of each sample of residual data 264 is B+n3 bits, where B is a bit depth of samples of the coding block and n3 is a value in a range of 1 to 8. In this example, the value of n3 may be dependent on a dynamic range of IACT 156. This example may also be performed as part of the decoding loop of video encoder 20.

A fifth example of this disclosure provides for clipping inputs to IACT to Max(B+n4, 16) bits, so that IACT's input buffer or array:

(1) can be kept at 16-bit resolution, if inputs' bit-depth B≤12-bit; or
(2) will go up to (B+n4)-bit resolution, if inputs' bit-depth B>12-bit, where the embodiment for n4 is as n4≥4, and n4<=32−B.

This clipping is proposed at the input of IACT, so its previous module could be ICCP or IT or any other possible valid module. It is under the assumption that extended precision is disabled, and input bit-depth B≤12 bit and B>12-bit are considered (See JCTVC Bug Track #1321). A benefit is that both software's and hardware's storage could be saved, especially in software, because 16 bit array resolution still can be kept, instead of 32-bit array for the case of input bit-depth<=12 bit. Because the bit depth resulting from clipping in this fifth example may be a predetermined value (e.g., 16) or the original bit depth plus n4, the bit depth resulting from clipping in this fifth example may be in a variable range. The range is variable because it is dependent on the original bit depth and n4.

Figure 7:
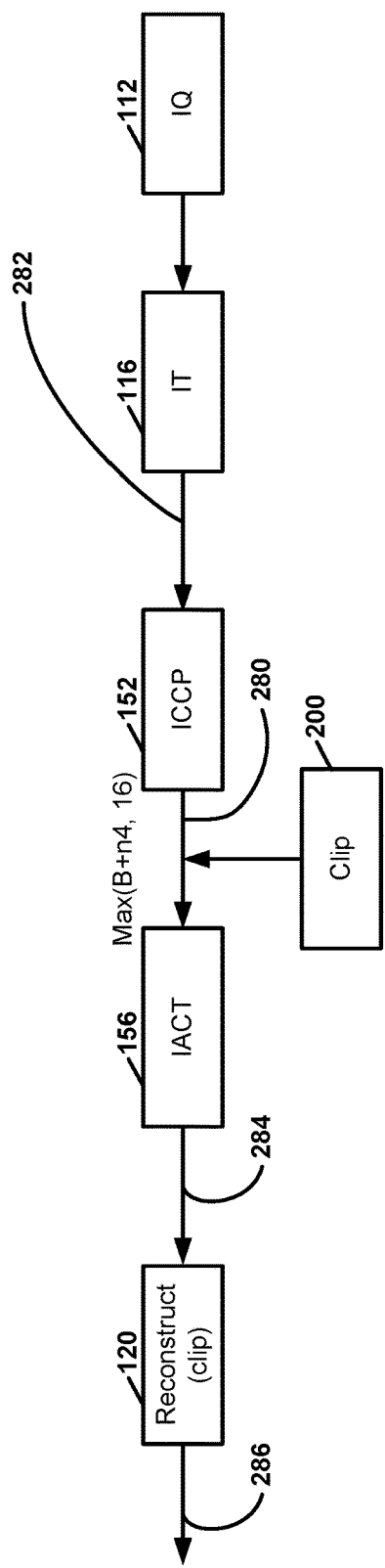
FIG. 7 is a conceptual diagram illustrating an example of clipping at an inverse ACT input, where a previous module is for inverse CCP (ICCP), in accordance with one or more techniques of this disclosure.
Figure 8:
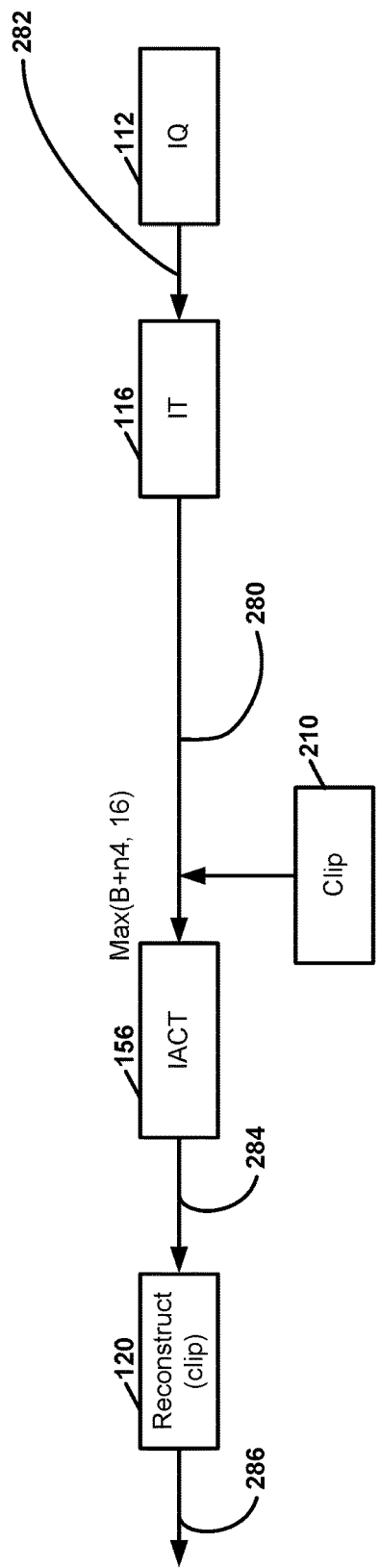
FIG. 8 is a conceptual diagram illustrating an example of clipping at an inverse ACT input, where a previous module is for inverse transform, in accordance with one or more techniques of this disclosure.

Diagrams for the fifth example of this disclosure are shown in FIG. 7 and FIG. 8. Particularly, FIG. 7 is a conceptual diagram illustrating an example of clipping at an IACT input, where a previous module is for inverse CCP, in accordance with one or more techniques of this disclosure. In the example of FIG. 7, video decoder 30, or a decoding loop of video encoder 20, may apply a clipping operation 200 to the output ICCP 152 (i.e., the input to IACT 156). As a result of clipping operation 200, the input to IACT 156 is the maximum of B+n4 and 16.

FIG. 8 is a conceptual diagram illustrating an example of clipping at an IACT input, where a previous module is for inverse transform, in accordance with one or more techniques of this disclosure. In the example of FIG. 8, video decoder 30, or a decoding loop of video encoder 20, may apply a clipping operation 210 to the output of IT 116 (i.e., the input to IACT 156). As a result of clipping operation 210, the input to inverse ACT 156 is the maximum of B+n4 and 16.

Thus, in both FIG. 7 and FIG. 8, a video coder, such as video encoder 20 or video decoder 30, may generate residual data 280 by applying an inverse transform (e.g., ICCP 152 in FIG. 7 or IT 116 in FIG. 8) to residual data 282. In the example of FIG. 7, residual data 282 is in the sample domain and in the example of FIG. 8, residual data 282 is in a transform domain (e.g., a frequency domain). The residual data 280 is input to IACT 156. After generating residual data 280 and prior to generating residual data 284, the video coder may clip the input to IACT 156 to a variable range based on a bit depth of the input to IACT 156. Furthermore, the video coder may generate residual data 284 by applying IACT 156 to the clipped input. Furthermore, the video coder may reconstruct, based on residual data 284, a coding block 286 of a CU of the video data.

As part of clipping the input to IACT 156 (i.e., residual data 280), based on a bit depth of the residual data 280 being less than or equal to a particular value (e.g., 12), the video coder may keep a resolution of residual data 280 at a particular resolution (e.g., 15 or 16). In this disclosure, the terms bit-depth and resolution may be interchangeable. Based on the bit depth of residual data 280 being greater than the particular value, the video coder may apply a clipping operation to residual data 280. For instance, the clipping operation may keep the bit depth at 16-bit resolution if the inputs' (i.e., residual data 280's) bit-depth B≤12-bit or allow the bit depth to go up to (B+n4)-bit resolution if inputs' bit-depth B>12-bit, where n4≥4 and n4<=32−B. In both FIG. 7 and FIG. 8, the video coder may clip residual data 280 such that residual data 280 has a bit depth equal to a maximum of (i) a bit depth of residual data 280 plus a value, and (ii) the particular resolution.

In another version of the fifth example of this disclosure, the video coder may generate residual data 280 by applying an inverse transform to residual data. After generating residual data 280 and prior to generating residual data 284, based on a bit depth of residual data 280 being less than or equal to a particular value, the video coder may keep a resolution of residual data 280 at a particular resolution. Alternatively, based on the bit depth of residual data 280 being greater than the particular value, the video coder may apply a clipping operation to residual data 280. In this example, the video coder may generate residual data 280 by applying ICCP transform 152 to residual data 282. Furthermore, the video coder may reconstruct, based on residual data 284, a coding block of a CU of the video data.

Figure 9A:
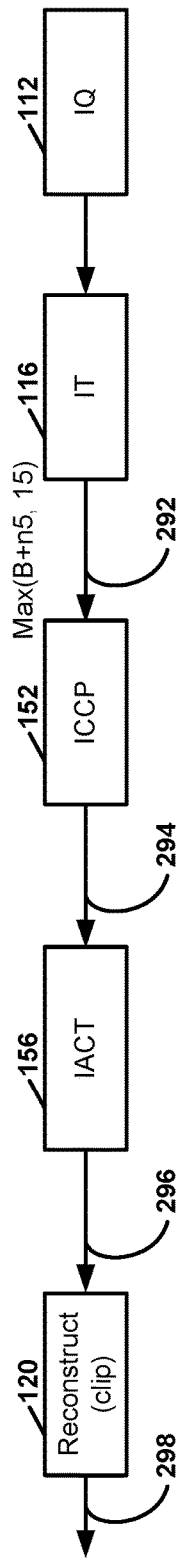
FIG. 9A is a conceptual diagram illustrating an example series of transforms, in which inputs to ICCP are subject to a constraint, in accordance with one or more techniques of this disclosure.

FIG. 9A is a conceptual diagram illustrating an example series of transforms, in which inputs to ICCP are subject to a constraint, in accordance with a sixth example of this disclosure. The sixth example of this disclosure constrains encoding of the bitstream, so that inputs to ICCP are limited to Max(B+n5, 15) bits, i.e., the inputs to ICCP:

(1) can be kept at 15-bit resolution, if inputs' bit-depth B<=12 bit; or
(2) will go up to (B+n5)-bit resolution, if inputs' bit-depth B>12 bit, where the embodiment for n5 is as n5>=3, and n5<=32−B.

In general, a "constraint" is a restriction defined by a video coding standard specifying that a bitstream violating the constraint does not conform to the video coding standard. Thus, if a bitstream conforms to the video coding standard, the bitstream does not violate the constraint.

ICCP can introduce one more bit along the data path. As a result, the use of ICCP can still align IACT's input buffer/array bit-depth to Max(B+n4, 16) bits as mentioned above with regard to the fifth example of this disclosure. FIG. 9A is a conceptual diagram illustrating an example series of transforms, in accordance with one or more techniques of this disclosure. This example is described with the assumption that extended precision is disabled, and input bit-depth B≤12 bit and B>12 bit are considered (See JCTVC Bug Track #1321). A benefit is that both software's and hardware's storage could be saved, especially in software, 16-bit array resolution still can be kept, instead of 32-bit array for the case of input bit-depth 12 bit.

As shown in the example of FIG. 9A, in the sixth example of this disclosure, the bitstream is encoded such that the input to ICCP 152 (i.e., residual data 292) is the maximum of B+n5 and 15. Moreover, as shown in the example of FIG. 9A, in this sixth example of this disclosure, the bitstream is encoded such that the input to IACT 156 (i.e., residual data 294) is the maximum of B+n4 and 16.

Thus, in the sixth example of this disclosure, video encoder 20 may generate a bitstream that is subject to a constraint that limits resolutions of sample values of residual data 292, which is provided as input to ICCP 152. The encoded bitstream comprises an encoded representation of the video data. In this example, video encoder 20 may output the bitstream. In this example, for each respective sample value of residual data 292, the constraint may limit a resolution of the respective sample value to whichever is greater of: a predefined value, or a value dependent on a resolution of original sample values of the CU.

Similarly, in the sixth example of this disclosure, video decoder 30 may determine, based on syntax elements obtained from an encoded bitstream that comprises an encoded representation of the video data, residual data 292 for a CU of the video data. In this example, the encoded bitstream is subject to a constraint that limits resolutions of sample values of residual data 292. Furthermore, in this example, video decoder 30 may generate residual data 294 by applying an inverse ICCP to residual data 292. Video decoder 30 may reconstruct, based on residual data 294, a coding block 298 of the CU. For instance, video decoder 30 may reconstruct the coding block based on residual data 294 by applying IACT 156 to residual data 294 to generate residual data 296, which video decoder 30 may use to reconstruct coding block 298.

For both video encoder 20 and video decoder 30, in the sixth example, for each respective sample value of residual data 292, the constraint may limit a resolution of the respective sample value to whichever is greater of: a predefined value (e.g., 15), or a value dependent on a resolution of original sample values of the CU (B+n5). In this example, the value dependent on the resolution of the original sample values of the CU is equal to the resolution of the original sample values of the CU plus a value (e.g., n5) that is greater than or equal to 3 and less than or equal to 32 minus the resolution of the original sample values of the CU (e.g., n5≥3 and n5≤32−B). In some instances, the predefined value is equal to 16 or another value equal to the precision needed for a particular implementation.

In this sixth example, when bit depths of original sample values of the CU are less than or equal to a first value (e.g., 12), the resolutions of sample values of the residual data 292 are kept at a second value (e.g., 15)). When bit depths of the original sample values of the CU are greater than the first value, the resolutions of the sample values of residual data 292 are limited to the bit depths of the original sample values of the CU plus a third value (e.g., n5). In this sixth example, the third value may be between a value that is greater than or equal to 3 and a value that is less than or equal to 32 minus the bit depths of the original sample values of the CU (e.g., n5≥3 and n5≤32−B).

Figure 9B:
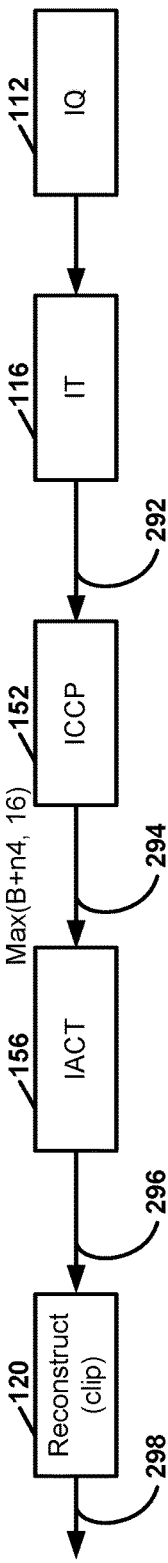
FIG. 9B is a conceptual diagram illustrating an example series of transforms, in which inputs to IACT are subject to a constraint, in accordance with one or more techniques of this disclosure.

FIG. 9B is a conceptual diagram illustrating an example series of transforms, in which inputs to IACT are subject to a constraint, in accordance with a seventh example of this disclosure. The seventh example of this disclosure constrains an encoded bitstream, so that inputs to IACT 156 are limited to Max(B+n5, 16) bits, i.e. the inputs to IACT 156:
(1) can be kept at 16-bit resolution, if inputs' bit-depth B<=12 bit; or
(2) will go up to (B+n5)bit resolution, if inputs' bit-depth is B>12 bit, where the embodiment for n5 is n5>=3, and n5<=32−B.

Thus, in the seventh example of this disclosure, video encoder 20 may generate a bitstream that is subject to a constraint that limits resolutions of sample values of residual data 294 for a CU of the video data. In this example, the encoded bitstream comprises an encoded representation of the video data. At a video decoder, the residual data 294 is input to IACT 156. Video encoder 20 may output the bitstream.

Similarly, in the seventh example of this disclosure, video decoder 30 may determine, based on syntax elements obtained from an encoded bitstream that comprises an encoded representation of the video data, residual data 294 for a CU of the video data. For instance, video decoder 30 may obtain syntax elements from the bitstream, determine quantized transform coefficients based on the syntax elements, inverse quantize the quantized transform coefficients, apply inverse transform IT 116, and apply ICCP 152, thereby obtaining residual data 294. In other instances, video decoder 30 may obtain syntax elements from the bitstream, determine quantized samples based on the syntax elements (e.g., data 230), inverse quantize the quantized samples, and apply ICCP 152, thereby obtaining residual data 294.

The encoded bitstream is subject to a constraint that limits resolutions of sample values of residual data 294. In this example, video decoder 30 may generate residual data 294 by applying ICCP 152 to residual data 292. Video decoder 30 may generate residual data 296 by applying IACT 156 to residual data 294. Video decoder 30 may reconstruct, based on residual data 296, coding block 298 of the CU.

In the seventh example of this disclosure, for both video encoder 20 and video decoder 30, for each respective sample value of residual data 294, a constraint limits a resolution of the respective sample value to whichever is greater of: a predefined value (e.g., 16), or a value dependent on a resolution of original sample values of the CU (e.g., B+n4). Furthermore, the value dependent on the resolution of the original sample values of the CU may be equal to the resolution of the original sample values of the CU plus a value that is greater than or equal to 3 and less than or equal to 32 minus the resolution of the original sample values of the CU.

Furthermore, in the seventh example of this disclosure, for both video encoder 20 and video decoder 30, when bit depths of original sample values of the CU are less than or equal to a first value (e.g., 12), the resolutions of sample values of the residual data 294 are kept at a second value (e.g., 16). When bit depths of the original sample values of the CU are greater than the first value (e.g., 12), the resolutions of the sample values of residual data 294 are limited to the bit depths of the original sample values of the CU (e.g., B) plus a third value (e.g., n4). The third value is between a value that is greater than or equal to 3 and a value that is less than or equal to 32 minus the bit depths of the original sample values of the CU (e.g., n5≥3 and n5≤32−B).

Figure 9C:
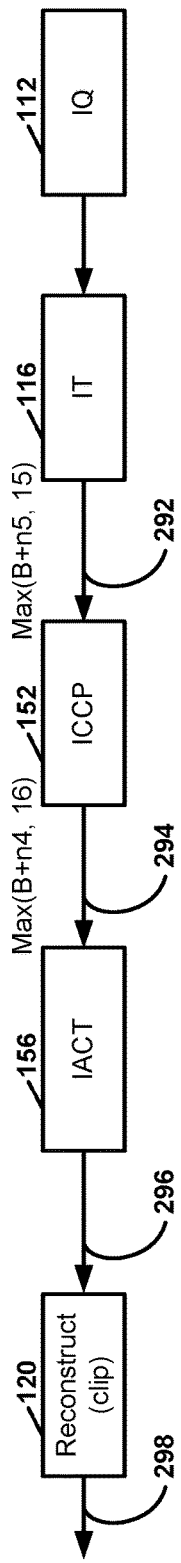
FIG. 9C is a conceptual diagram illustrating an example series of transforms showing a condensed form of FIG. 9A and FIG. 9B, in accordance with one or more techniques of this disclosure.

FIG. 9C is a conceptual diagram illustrating an example series of transforms showing a condensed form of FIG. 9A and FIG. 9B, in accordance with one or more techniques of this disclosure. FIG. 9C concurrently shows the effects of both the sixth and seventh examples described above.

Figure 10:
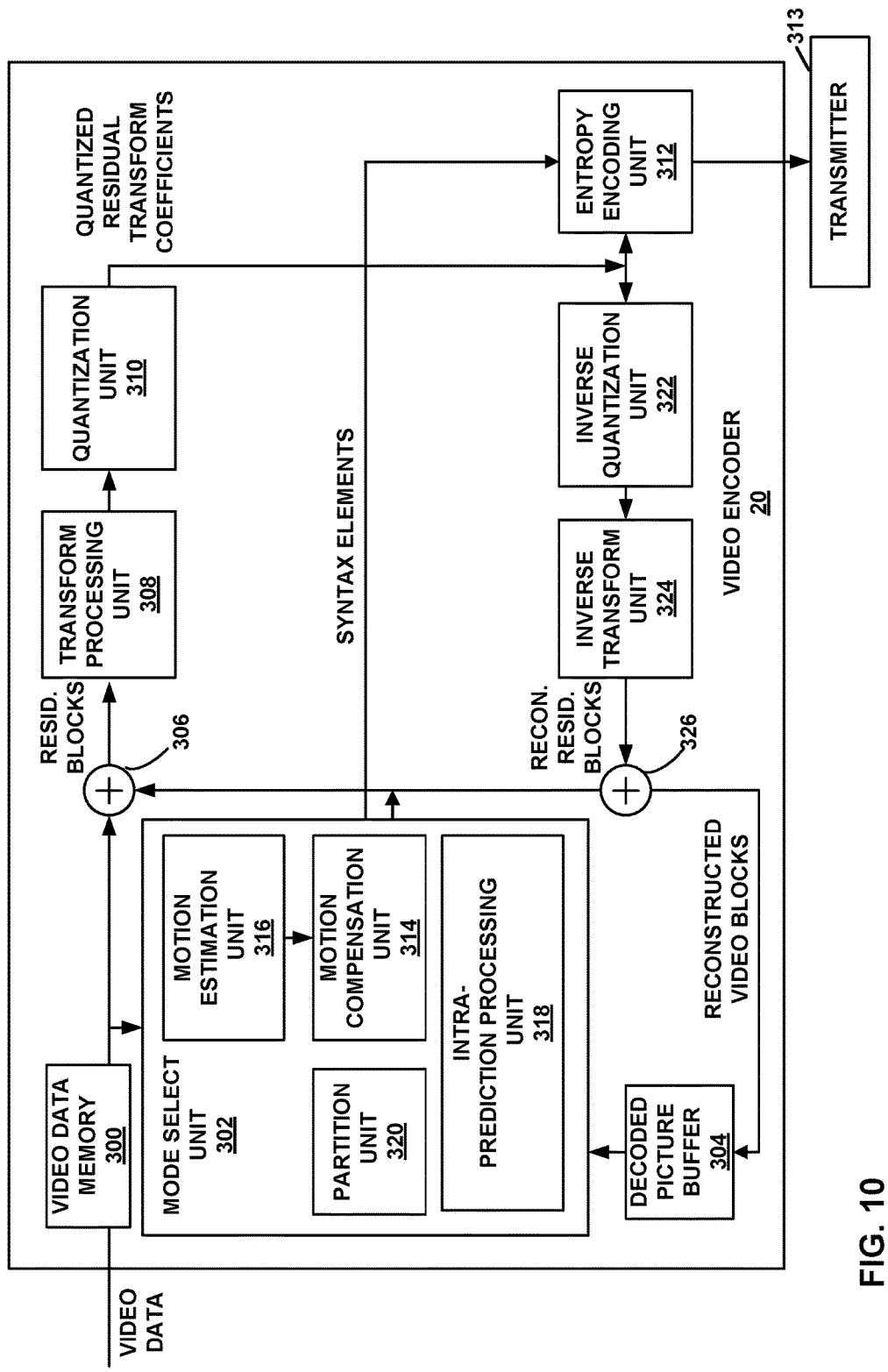
FIG. 10 is a block diagram illustrating an example of a video encoder that may perform techniques in accordance with one or more aspects of this disclosure.

FIG. 10 is a block diagram illustrating an example of video encoder 20 that may perform techniques in accordance with one or more aspects of this disclosure. In the example of FIG. 10, video encoder 20 includes video data memory 300, mode select unit 302, decoded picture buffer 304, summer 306, transform processing unit 308, quantization unit 310, and entropy encoding unit 312. Mode select unit 302, in turn, includes motion compensation unit 314, motion estimation unit 316, intra-prediction processing unit 318, and partition unit 320. For video block reconstruction, video encoder 20 also includes inverse quantization unit 322, inverse transform unit 324, and summer 326.

Video data memory 300 may store video data to be encoded by the components of video encoder 20. The video data stored in video data memory 300 may be obtained, for example, from video source 18. Decoded picture buffer 304 may be a reference picture memory that stores reference video data for use in encoding video data by video encoder 20, e.g., in intra- or inter-coding modes. Video data memory 300 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 300 and decoded picture buffer 304 may be provided by the same memory device or separate memory devices. In various examples, video data memory 300 may be on-chip with other components of video encoder 20, or off-chip relative to those components.

During the encoding process, video encoder 20 receives a video frame or slice to be coded. The frame or slice may be divided into multiple video blocks. In this way, video encoder 20 may receive a current video block within a video frame to be encoded.

Motion estimation unit 316 and motion compensation unit 314 perform inter-predictive coding of the received video block relative to one or more blocks in one or more reference frames to provide temporal prediction. Intra-prediction processing unit 318 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Partition unit 320 may partition blocks of video data into sub-blocks, based on evaluation of previous partitioning schemes in previous coding passes. For example, partition unit 320 may initially partition a frame or slice into LCUs, and partition each of the LCUs into sub-CUs based on rate-distortion analysis (e.g., rate-distortion optimization). Mode select unit 302 may further produce a quadtree data structure indicative of partitioning of an LCU into CUs. Leaf-node CUs of the quadtree may include one or more PUs and one or more TUs.

Mode select unit 302 may select one of the coding modes, intra or inter, e.g., based on error results, and may provide the resulting intra- or inter-coded block to summer 306. Summer 306 may generate residual block data. For instance, summer 306 may generate residual block data for a current CU such that each sample of the residual block data is equal to a difference between a sample in a coding block of the current CU and a corresponding sample of a prediction block of a PU of the current CU. Summer 306 may perform residual generation operation 48 of FIG. 2 and residual generation operation 100 of FIG. 3, FIG. 4A, FIG. 4B, FIG. 5A, FIG. 5B, FIG. 5C, and FIG. 5D.

Summer 326 may reconstruct the encoded block (i.e., the coding block) for use as a reference frame. Summer 326 may perform reconstruction operation 84 of FIG. 2 and reconstruction operation 120 of FIG. 3, FIG. 4A, FIG. 4B, FIG. 5A, FIG. 5B, FIG. 5C, FIG. 5D, FIG. 6A, FIG. 6B, FIG. 6C, FIG. 6D, FIG. 7, FIG. 8, FIG. 9A, FIG. 9B, and FIG. 9C. Mode select unit 302 also provides syntax elements, such as motion vectors, intra-mode indicators, partition information, and other such syntax information, to entropy encoding unit 312.

Motion estimation, performed by motion estimation unit 316, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded (i.e., the prediction block), in terms of pixel difference, which may be determined by sum of absolute difference (SAD), sum of square difference (SSD), or other difference metrics.

Motion compensation unit 314 may perform motion compensation. Motion compensation may involve fetching or generating one or more predictive blocks for a PU based on the one or more motion vectors determined for the PU by motion estimation unit 316. Upon receiving a motion vector for a PU of a current video block, motion compensation unit 314 may locate, based on the motion vector, a predictive block from a picture of one of the reference picture lists. In general, motion estimation unit 316 performs motion estimation relative to luma components, and motion compensation unit 314 uses motion vectors calculated based on the luma components for both chroma components and luma components. Mode select unit 302 may also generate syntax elements associated with the video blocks and the video slice for use by video decoder 30 in decoding the video blocks of the video slice.

Intra-prediction processing unit 318 may intra-predict a current block, as an alternative to the inter-prediction performed by motion estimation unit 316 and motion compensation unit 314. In particular, intra-prediction processing unit 318 may determine an intra-prediction mode to use to encode a current block. In some examples, intra-prediction processing unit 318 may encode a current block using various intra-prediction modes, e.g., during separate encoding passes, and intra-prediction processing unit 318 (or mode select unit 302, in some examples) may select an appropriate intra-prediction mode to use from the tested modes. After selecting an intra-prediction mode for a block, intra-prediction processing unit 318 may provide information indicative of the selected intra-prediction mode for the block to entropy encoding unit 312. Entropy encoding unit 312 may encode the information indicating the selected intra-prediction mode.

Video encoder 20 may form a residual video block by determining differences between prediction data (e.g., a predictive block) from mode select unit 302 and data from an original video block (e.g., a coding block) being coded. Summer 306 represents the component or components that perform this difference operation. Transform processing unit 308 may apply a transform to the residual block, producing a video block (i.e., a transform coefficient block) comprising residual transform coefficient values. For example, transform processing unit 308 may apply a discrete cosine transform (DCT) or a conceptually similar transform to the residual block produce the residual coefficient values.

Transform processing unit 308 may perform other transforms which are conceptually similar to DCT. Wavelet transforms, integer transforms, sub-band transforms or other types of transforms could also be used. In any case, transform processing unit 308 applies the transform to the residual block, producing a block of residual transform coefficients. The transform may convert the residual information from a pixel (or sample) value domain to a transform domain, such as a frequency domain. Transform processing unit 308 may send the resulting transform coefficients to quantization unit 310.

Furthermore, transform processing unit 308 may apply an ACT transform and/or a CCP transform to the residual data. Furthermore, in accordance with one or more techniques of this disclosure, transform processing unit 308 may apply clipping operations to residual data to reduce bit depths of residual data resulting from the sample-to-transform domain transform, the ACT transform, and/or the CCP transform. Thus, transform processing unit 308 may perform transform 60 of FIG. 2 and transform 104 of FIG. 3, FIG. 4A, FIG. 4B, FIG. 5A, FIG. 5B, FIG. 5C, and FIG. 5D. Furthermore, transform processing unit 308 may perform CCP 56 of FIG. 2 and CCP 150 of FIG. 4A, FIG. 4B, FIG. 5A, FIG. 5B, FIG. 5C, and FIG. 5D. Additionally, transform processing unit 308 may perform ACT 52 of FIG. 2 and ACT 154 of FIG. 4A, FIG. 4B, FIG. 5C, and FIG. 5D. In some examples, transform processing unit 308 may enforce the constraints described with regard to the sixth and seventh examples above.

Quantization unit 310 quantizes the transform coefficients to further reduce bit rate. The quantization process may reduce the bit depth associated with some or all of the coefficients. The degree of quantization may be modified by adjusting a quantization parameter. In some examples, quantization unit 310 performs quantization operation 64 of FIG. 2 and quantization operation 108 of FIG. 3, FIG. 4A, FIG. 4B, FIG. 5A, FIG. 5B, FIG. 5C, and FIG. 5D. Furthermore, in some examples, quantization unit 310 may then perform a scan of the matrix including the quantized transform coefficients. Alternatively, entropy encoding unit 312 may perform the scan.

Video encoder 20 may encode various parameter sets in a coded video bitstream. Such parameter sets may include a picture parameter set (PPS), which may include syntax elements that are common to one or more pictures, and/or a sequence parameter set, which may include syntax elements that are common to one or more sequences of pictures.

Following quantization, entropy encoding unit 312 entropy codes the quantized transform coefficients. In other words, entropy encoding unit 312 may entropy encode syntax elements representing the quantized transform coefficients. For example, entropy encoding unit 312 may perform context adaptive binary arithmetic coding (CABAC), context adaptive variable length coding (CAVLC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 312, video encoder 20 may transmit the encoded bitstream to another device (e.g., video decoder 30) or archived for later transmission or retrieval. In the example of FIG. 10, a transmitter 313 transmits the bitstream. Transmitter 313 may be part of output interface 22.

Inverse quantization unit 322 and inverse transform unit 324 apply inverse quantization and inverse transformation, respectively, to generate the residual block in the pixel domain, e.g., for later use as a reference block. For instance, inverse quantization unit 322 may dequantize a transform coefficient block. Inverse transform unit 324 may generate a transform block of a TU by applying an inverse transform to the dequantized transform coefficient block. Inverse quantization unit 322 may perform inverse quantization operation 68 of FIG. 2 and inverse quantization operation 112 of FIG. 3, FIG. 4A, FIG. 4B, FIG. 5A, FIG. 5B, FIG. 5C, FIG. 5D, FIG. 6A, FIG. 6B, FIG. 6C, FIG. 6D, FIG. 7, FIG. 8, FIG. 9A, FIG. 9B, and FIG. 9C. Inverse transform unit 322 may perform inverse transform 72 of FIG. 2 and inverse transform 116 of FIG. 3, FIG. 4A, FIG. 4B, FIG. 5A, FIG. 5B, FIG. 5C, FIG. 5D, FIG. 6A, FIG. 6B, FIG. 6C, FIG. 6D, FIG. 7, FIG. 8, FIG. 9A, FIG. 9B, and FIG. 9C. Furthermore, inverse transform unit 322 may perform ICCP 76 of FIG. 2 and ICCP 152 of FIG. 4A, FIG. 4B, FIG. 5A, FIG. 5B, FIG. 5C, FIG. 5D, FIG. 6A, FIG. 6B, FIG. 6C, FIG. 6D, FIG. 7, FIG. 9A, FIG. 9B, and FIG. 9C. Inverse transform unit 322 may perform IACT 80 of FIG. 2 and IACT 156 of FIG. 4B, FIG. 5C, FIG. 5D, FIG. 6A, FIG. 6B, FIG. 6C, FIG. 6D, FIG. 7, FIG. 8, FIG. 9A, FIG. 9B, and FIG. 9C.

Inverse quantization unit 322, inverse transform unit 324, and summer 326 may form a decoding loop of video encoder 20. In accordance with one or more techniques of this disclosure, inverse transform unit 324 may apply an inverse ACT and an inverse CCP transform. Furthermore, in accordance with one or more techniques of this disclosure, inverse transform unit 324 may perform clipping operations, as described in examples elsewhere in this disclosure.

Summer 326 adds the residual block to the motion compensated prediction block produced by motion compensation unit 314 to produce a reconstructed video block for storage in decoded picture buffer 304. Motion estimation unit 316 and motion compensation unit 314 may use the reconstructed video block as a reference block to inter-code (i.e., inter predict) a block in a subsequent video frame.

Motion estimation unit 316 may determine one or more reference pictures, that video encoder 20 may use to predict the pixel values of one or more PUs that are inter-predicted. Motion estimation unit 316 may store the reference pictures in a decoded picture buffer 304 until the pictures are marked as unused for reference. Mode select unit 302 of video encoder 20 may encode various syntax elements that include identifying information for one or more reference pictures.

Figure 11:
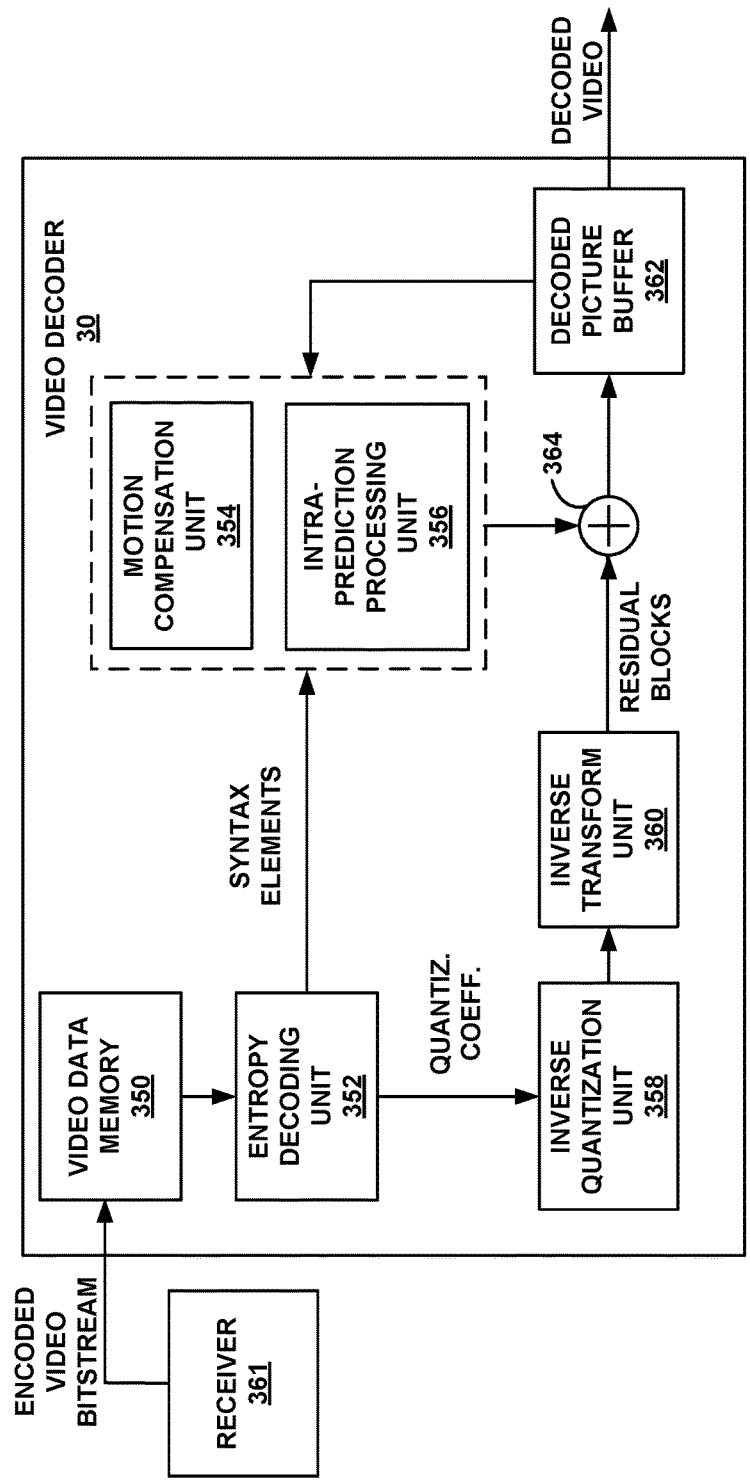
FIG. 11 is a block diagram illustrating an example of a video decoder that may perform techniques in accordance with one or more aspects of this disclosure.

FIG. 11 is a block diagram illustrating an example of a video decoder that may perform techniques in accordance with one or more aspects of this disclosure. In the example of FIG. 11, video decoder 30 includes a video data memory 350, an entropy decoding unit 352, motion compensation unit 354, intra-prediction processing unit 356, inverse quantization unit 358, inverse transformation unit 360, decoded picture buffer 362, and summer 364. In some examples, video decoder 30 may perform a decoding pass generally reciprocal to the encoding pass described with respect to video encoder 20 (FIG. 1 and FIG. 10).

Video data memory 350 may store video data, such as an encoded video bitstream, to be decoded by the components of video decoder 30. The video data stored in video data memory 350 may be obtained, for example, from channel 16 (FIG. 1), e.g., from a local video source, such as a camera, via wired or wireless network communication of video data, or by accessing physical data storage media. Video data memory 350 may form a coded picture buffer (CPB) that stores encoded video data from an encoded video bitstream. Decoded picture buffer 362 may be a reference picture memory that stores reference video data for use in decoding video data by video decoder 30, e.g., in intra- or inter-coding modes. Video data memory 350 and decoded picture buffer 362 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 350 and decoded picture buffer 362 may be provided by the same memory device or separate memory devices. In various examples, video data memory 350 may be on-chip with other components of video decoder 30, or off-chip relative to those components. As shown in the example of FIG. 11, video decoder 30 may receive the encoded video bitstream from a receiver 361. Receiver 361 may be part of input interface 28.

During the decoding process, video decoder 30 receives an encoded video bitstream that represents video blocks of an encoded video slice and associated syntax elements and/or syntax data from video encoder 20. Entropy decoding unit 352 of video decoder 30 entropy decodes the bitstream to generate quantized coefficients, motion vectors or intra-prediction mode indicators, and other syntax elements. Entropy decoding unit 352 may forward syntax elements to motion compensation unit 354.

Entropy decoding unit 352 may decode and parse additional syntax elements in various parameter sets. Such parameter sets may include a PPS, which may include syntax elements that are common to one or more pictures, and/or an SPS, which may include syntax elements that are common to one or more sequences of pictures.

Video decoder 30 may construct reference picture lists, List 0 and List 1, (e.g., using default construction techniques) based on reference pictures stored in decoded picture buffer 362. When the video slice is coded as an intra-coded (I) slice, intra-prediction processing unit 356 may generate prediction data for a video block of a current video slice. Intra-prediction processing unit 356 may generate the prediction data based on a signaled intra prediction mode and data from previously decoded blocks of the current frame or picture. When video decoder 30 codes slices of the video frame as an inter-coded (i.e., B or P) slice, motion compensation unit 354 may produce predictive blocks for a video block of the current video slice based on the motion vectors and other syntax elements received from entropy decoding unit 352. Motion compensation unit 354 may produce the predictive blocks from one of the reference pictures within one of the reference picture lists.

Motion compensation unit 354 may use motion vectors and/or syntax elements to determine prediction information for a video block of the current video slice. In some examples, motion compensation unit 354 may generate prediction information based on motion vectors received from entropy decoding unit 352. Motion compensation unit 354 may use the prediction information to produce the predictive blocks for the current video block being decoded. For example, motion compensation unit 354 uses some of the received syntax elements to determine a prediction mode (e.g., intra- or inter-prediction) used to code the video blocks of the current video slice, an inter-prediction slice type (e.g., B slice or P slice slice), construction information for one or more of the reference picture lists for the slice, motion vectors for each inter-encoded video block of the current video slice, inter-prediction status for each inter-coded video block of the slice, and other information to decode the video blocks in the current video slice.

Inverse quantization unit 358 inverse quantizes, i.e., dequantizes, the quantized transform coefficients provided in the bitstream and decoded by entropy decoding unit 352. The inverse quantization process may include use of a quantization parameter $QP_Y$ to determine a degree of quantization and, likewise, a degree of inverse quantization that should be applied. Video decoder 30 may calculate the quantization parameter $QP_Y$ for each video block in the video slice.

Inverse transform unit 360 may receive dequantized transform coefficient blocks. If transform is skipped for the current block, inverse transform unit 360 may receive dequantized residual blocks. Inverse transform unit 360 may transform the received blocks using an inverse transform. In some examples, the inverse transform (e.g., an inverse DCT, an inverse integer transform, or a conceptually similar inverse transform process) to the transform coefficients in order to produce residual blocks (e.g., transform blocks) in the pixel domain. Inverse transform unit 360 may output a signal, referred to as a "residual signal"

Furthermore, inverse transform unit 360 may apply an inverse ACT transform and/or an inverse CCP transform to the inverse transformed (such as inverse cosine transform or inverse sine transform) residual data. Furthermore, in accordance with one or more techniques of this disclosure, inverse transform unit 360 may apply clipping operations to the inverse transformed residual data to reduce bit depths of the inverse transformed residual data resulting from the transform-to-sample domain transform, the inverse ACT transform, and/or the inverse CCP transform.

Video decoder 30 may also determine that the current block is intra-predicted based on syntax elements or other information. If the current video block is intra-predicted, intra-prediction processing unit 356 may decode the current block. Intra-prediction processing unit 356 may determine a neighboring predictive block from the same picture as the current block. Intra-prediction processing unit 356 may generate a transform coefficient block and/or a residual block based on the predictive block.

After motion compensation unit 354 or intra-prediction processing unit 356 generates a transform coefficient block and/or residual block for a current video block based on the motion vectors and other syntax elements, video decoder 30 forms a decoded video block by combining the residual blocks from inverse transform unit 358 with the corresponding predictive blocks generated by motion compensation unit 354. Summer 364 represents the component or components that perform this summation operation. Decoded picture buffer 362 stores the decoded video blocks in a given frame or picture, which video decoder 30 may use for subsequent motion compensation. Decoded picture buffer 362 may also store decoded video for later presentation on a display device, such as display device 32 of FIG. 1.

Motion compensation unit 354 and/or intra-prediction processing unit 356 may determine the block of chroma residual samples based on the luma residual block, a scale factor, and predicted chroma residual samples. With the block of chroma residual samples, summer 364 may sum the chroma residual samples and the luma residual samples with respective chroma samples and luma samples of the predictive block to decode the current block (e.g., reconstruct the current block). Summer 364 may perform reconstruction operation 120 of FIG. 3, FIG. 4A, FIG. 4B, FIG. 5A, FIG. 5B, FIG. 5C, FIG. 5D, FIG. 6A, FIG. 6B, FIG. 6C, FIG. 6D, FIG. 7, FIG. 8, FIG. 9A, FIG. 9B, and FIG. 9C. Once video decoder 30 generates reconstructed video, video decoder 30 may output the reconstructed video blocks as decoded video (e.g., for display or storage) in some examples.

As described above, during inter-prediction, motion compensation unit 354 may determine one or more reference pictures that video decoder 30 may use to form the predictive video blocks for the current block being decoded. Motion compensation unit 354 may store the reference pictures in decoded picture buffer 362 until the reference pictures are marked as unused for reference.

Figure 12:
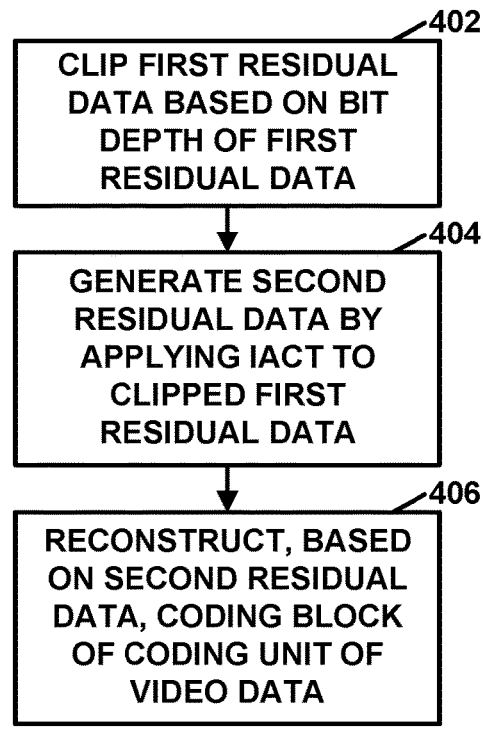
FIG. 12 is a flowchart illustrating an example operation of a video coder, in accordance with a technique of this disclosure.

FIG. 12 is a flowchart illustrating an example operation of a video coder, in accordance with a technique of this disclosure. The operation of FIG. 12 may be performed by a video encoder (e.g., video encoder 20 of FIG. 1 and FIG. 10), a video decoder (e.g., video decoder 30 of FIG. 1 and FIG. 11), or another unit or device.

In the example of FIG. 12, the video coder may clip first residual data to a variable range based on a bit depth of the first residual data (402). In some examples, the video coder may generate first inverse transformed residual data by applying an inverse transform to transformed residual data. In some examples, the inverse transform is a transform from a transform domain to a sample domain. For instance, the inverse transform may be an inverse discrete cosine transform or an inverse discrete sine transform. In other examples, the inverse transform may be the ICCP. The first residual data is input to an IACT.

Furthermore, the video coder may generate second residual data at least in part by applying the IACT to the clipped first residual data (404). In some examples, one or more changes in addition to the IACT may be applied to generate the second residual data. The video coder may reconstruct, based on the second residual data, a coding block of a CU of the video data (406). For example, the video coder may reconstruct the coding block of the CU such that each respective sample of the coding block that corresponds to a sample of the second residual data is substantially equal (e.g., with possible rounding error) to a sum of a sample of the second residual data and a corresponding sample of a predictive block of a PU of the CU.

In this example, the video coder may generate first residual data by applying an inverse transform to residual data. After generating the first residual data and prior to generating second residual data:

(i) based on a bit depth of the first inverse transformed residual data being less than or equal to a particular value, the video coder may keep a resolution of the first inverse transformed residual data at a particular resolution; or (ii) based on the bit depth of the first inverse transformed residual data being greater than the particular value, the video coder may apply a clipping operation to the first inverse transformed residual data.

In this example, the video coder may generate the second residual data by applying an IACT to the first residual data. The video coder may reconstruct, based on the second residual data, a coding block of a CU of the video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. For instance, the blocks of FIG. 10 and FIG. 11 may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any con is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding video data, the method comprising:
   clipping input to an inverse Adaptive Color Transform (IACT) to a maximum of (i) 16 bits and (ii) a bit depth equal to a bit depth of prediction pixels plus a value, where the value is greater than or equal to 4 and the value is less than or equal to 32 minus the bit depth of the prediction pixels, wherein the input to the IACT is first residual data;
   generating second residual data at least in part by applying the IACT to the clipped input; and
   reconstructing, based on the second residual data, a coding block of a coding unit (CU) of the video data.

2. The method of claim 1, wherein the prediction pixels are first prediction pixels, the input to the IACT is first input to the IACT, the CU is a first CU, and clipping the first input comprises:
   based on the bit depth of the prediction pixels being less than or equal to a particular value, keeping a bit depth of the first residual data at 16 bits, and
   the method further comprises:
      clipping second input to the IACT to a maximum of (i) 16 and (ii) a bit depth equal to a bit depth of second prediction pixels plus a value greater than or equal to 4 and less than or equal to 32 minus the bit depth of the second prediction pixels, wherein the second input to the IACT is third residual data, wherein clipping the second input comprises, based on the bit depth of the second prediction pixels being greater than the particular value, applying a clipping operation to the third residual data;
      generating fourth residual data at least in part by applying the IACT to the clipped second input; and
      reconstructing, based on the fourth residual data, a coding block of a second coding unit (CU) of the video data.

3. The method of claim 2, wherein the particular value is 12.

4. The method of claim 1, further comprising applying an inverse cross-component prediction (ICCP) transform to generate the first residual data.

5. The method of claim 1, further comprising applying an inverse transform from a transform domain to a sample domain to generate the first residual data.

6. The method of claim 5, wherein the inverse transform is an inverse discrete cosine transform.

7. The method of claim 1, the method being executable on a wireless communication device, wherein the wireless communication device comprises:
   a memory configured to store the video data;
   a processor configured to execute instructions to process the video data stored in said memory; and
   at least one of:
      a transmitter configured to transmit a bitstream that comprises an encoded representation of the video data, the encoded representation of the video data comprising an encoded representation of the CU; or
      a receiver configured to receive the bitstream that comprises the encoded representation of the video data.

8. The method of claim 7, wherein:
the wireless communication device is a cellular telephone,
the bitstream is modulated according to a cellular communication standard, and
at least one of:
the bitstream is transmitted by the transmitter, or
the bitstream is received by the receiver.

9. The method of claim 1, wherein clipping the input comprises:
based on the bit depth of the prediction pixels being greater than a particular value, applying a clipping operation to the first residual data.

10. A device for encoding or decoding video data, the device comprising:
a memory configured to store the video data; and
one or more processors configured to:
clip input to an inverse Adaptive Color Transform (IACT) to a maximum of (i) 16 bits and (ii) a bit depth equal to a bit depth of prediction pixels plus a value, where the value is greater than or equal to 4 and the value is less than or equal to 32 minus the bit depth of the prediction pixels, wherein the input to the IACT is first residual data;
generate second inverse transformed residual data at least in part by applying the IACT to the clipped input; and
reconstruct, based on the second inverse transformed residual data, a coding block of a coding unit (CU) of the video data.

11. The device of claim 10, wherein the one or more processors are configured such that, as part of clipping the input, the one or more processors:
based on the bit depth of the prediction pixels being less than or equal to a particular value, keep a bit depth of the first residual data at 16 bits; and
based on the bit depth of the prediction pixels being greater than the particular value, apply a clipping operation to the first residual data.

12. The device of claim 11, wherein the particular value is 12.

13. The device of claim 10, wherein the one or more processors are configured to apply an inverse cross-component prediction (ICCP) transform to generate the first residual data.

14. The device of claim 10, wherein the one or more processors are configured to apply an inverse transform from a transform domain to a sample domain to generate the first residual data.

15. The device of claim 14, wherein the inverse transform is an inverse discrete cosine transform.

16. The device of claim 10, wherein the device is a wireless communication device, further comprising at least one of:
a transmitter communicatively coupled to the one or more processors, the transmitter configured to transmit a bitstream that comprises an encoded representation of the video data, the encoded representation of the video data comprising an encoded representation of the CU; or
a receiver communicatively coupled to the one or more processors, the receiver configured to receive the bitstream that comprises the encoded representation of the video data.

17. The device of claim 16, wherein:
the wireless communication device is a cellular telephone,
the bitstream is modulated according to a cellular communication standard, and
at least one of:
the bitstream is transmitted by the transmitter, or
the bitstream is received by the receiver.

18. A device for encoding or decoding video data, the device comprising:
means for clipping input to an inverse Adaptive Color Transform (IACT) to a maximum of (i) 16 bits and (ii) a bit depth equal to a bit depth of prediction pixels plus a value, where the value is greater than or equal to 4 and the value is less than or equal to 32 minus the bit depth of the prediction pixels, wherein the input to the IACT is first residual data;
means for generating second residual data at least in part by applying the IACT to the clipped input; and
means for reconstructing, based on the second inverse transformed residual data, a coding block of a coding unit (CU) of the video data.

19. The device of claim 18, wherein the means for clipping the input comprises:
means for keeping, based on the bit depth of the prediction pixels being less than or equal to a particular value, a bit depth of the first residual data at 16 bits; and
means for applying, based on the bit depth of the prediction pixels being greater than the particular value, a clipping operation to the first residual data.

20. The device of claim 19, wherein the particular value is 12.

21. The device of claim 18, further comprising means for applying an inverse cross-component prediction (ICCP) transform to generate the first residual data.

22. The device of claim 18, further comprising means for applying an inverse transform from a transform domain to a sample domain to generate the first residual data.

23. The device of claim 22, wherein the inverse transform is an inverse discrete cosine transform.

24. A computer-readable storage medium having stored thereon instructions that, when executed, cause one or more processors of a device for encoding or decoding video data to:
clip input to an inverse Adaptive Color Transform (IACT) to a maximum of (i) 16 bits and (ii) a bit depth equal to a bit depth of prediction pixels plus a value, where the value is greater than or equal to 4 and the value is less than or equal to 32 minus the bit depth of the prediction pixels, wherein the input to the IACT is first residual data;
generate second residual data at least in part by applying the IACT to the clipped input; and
reconstruct, based on the second residual data, a coding block of a coding unit (CU) of the video data.

25. The computer-readable storage medium of claim 24, wherein the instructions cause the one or more processors to clip the input in part by causing the one or more processors to:
based on the bit depth of the prediction pixels being less than or equal to a particular value, keep a bit depth of the first residual data at 16 bits; and
based on the bit depth of the prediction pixels being greater than the particular value, apply a clipping operation to the first residual data.

* * * * *